(12) United States Patent
Kondou et al.

(10) Patent No.: US 6,383,641 B1
(45) Date of Patent: May 7, 2002

(54) TRANSPARENT COATED MOLDED PRODUCT AND METHOD FOR PRODUCING THE SAME

(75) Inventors: Satoshi Kondou; Toshihiko Higuchi; Hirotsugu Yamamoto; Takashi Shibuya; Mika Yokoyama; Junko Asakura, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/133,379

(22) Filed: Aug. 13, 1998

(30) Foreign Application Priority Data

Aug. 15, 1997 (JP) .............................. 9-220468
Dec. 24, 1997 (JP) .............................. 9-355588
Mar. 24, 1998 (JP) ............................ 10-076040

(51) Int. Cl.$^7$ .............................. B32B 27/36; C08J 7/18
(52) U.S. Cl. .................. 428/412; 428/429; 428/430; 428/447; 428/448; 427/487; 427/492; 427/503; 427/515; 427/163.1; 427/164; 427/412.1; 264/1.36
(58) Field of Search ................... 428/412, 704, 428/908.8, 428, 429, 430, 447, 448; 264/1.36; 427/487, 492, 493, 498, 503, 512, 515, 164, 412.1, 163.1, 171

(56) References Cited

U.S. PATENT DOCUMENTS

| 4,112,171 A | | 9/1978 | Motter et al. ............... 428/213 |
|---|---|---|---|
| 4,190,681 A | | 2/1980 | Hall et al. ................. 427/45.1 |
| 4,678,688 A | | 7/1987 | Itoh et al. .................... 427/387 |
| 4,822,828 A | | 4/1989 | Swofford ...................... 522/84 |
| 4,842,664 A | * | 6/1989 | Baudin ....................... 428/412 |
| 5,316,791 A | * | 5/1994 | Farber et al. ................ 427/464 |
| 5,811,472 A | * | 9/1998 | Patel ........................... 522/14 |
| 5,922,411 A | * | 7/1999 | Shimizu et al. ............. 428/688 |

FOREIGN PATENT DOCUMENTS

| JP | A-61-181809 | 8/1986 |
|---|---|---|
| JP | 03-145602 | 6/1991 |
| JP | A-8-143689 | 6/1996 |
| JP | A-9-39161 | 2/1997 |

* cited by examiner

*Primary Examiner*—Paul Thibodeau
*Assistant Examiner*—Monique R. Jackson
(74) *Attorney, Agent, or Firm*—Oblon, Spivak, McClelland, Maier & Neustadt, P.C.

(57) ABSTRACT

A transparent coated molded product comprising a transparent synthetic resin substrate and two or more transparent cured material layers provided on at least one part of the surface of the transparent synthetic resin substrate, wherein an inner layer in contact with the outermost layer of the two or more transparent cured material layers is an abrasion-resistant layer which is a cured material of an active energy ray-curable coating agent (A) containing a polyfunctional compounds (a) having at least 2 active energy ray-curable polymerizable functional groups and the outermost layer is a silica layer which is a cured material of a curable coating agent (B) of polysilazane or a curable coating agent (B) containing polysilazane.

19 Claims, No Drawings

TRANSPARENT COATED MOLDED PRODUCT AND METHOD FOR PRODUCING THE SAME

The present invention relates to a transparent coated molded product having a transparent cured material layer excellent in abrasion resistance, transparency and weather resistance, which comprises a cured material layer derived from an active energy ray (particularly ultraviolet light)—curable coating agent and a silica layer derived from a coating agent of polysilazane or a coating agent containing polysilazane, on a transparent synthetic resin substrate, and a method for producing the transparent coated molded product.

Recently, a transparent synthetic resin material has been used as a transparent material in place of glass. Particularly, an aromatic polycarbonate type resin is excellent in shatter resistance, transparency, lightness and processability, and is used as a transparent material of large area for an outer wall, an arcade and the like. Also, a transparent synthetic resin material is used for vehicles such as automobiles partly in place of glass (hereinafter referred to as "inorganic glass"). However, as a substitute for glass, the transparent synthetic resin material has a defect of easily losing its transparency because it is liable to be damaged or to be abraded due to its insufficient hardness of the surface. Heretofore, many attempts have been made to improve resistance to scuffing or abrasion resistance of an aromatic polycarbonate type resin. One of most general methods is to obtain a molded product having a transparent cured material layer excellent in resistance to scuffing by coating a polymerization-curable compound having at least 2 polymerizable functional groups such as an acryloyl group in one molecule on a substrate and curing by heat or an active energy ray such as ultraviolet light. According to this method, a coating composition is relatively stable, and productivity is excellent since curing can be made by ultraviolet light, and when a molded product is bending-processed, cracks do not occur on a cured coating layer and resistance to scuffing and abrasion resistance of the surface of the layer are improved. However, since the cured coating layer comprises an organic material only, the level of resistance to scuffing of the surface of the layer is limited.

On the other hand, as a method for imparting a higher surface hardness to a substrate, there is a method comprising coating a metal alkoxide compound on a substrate and curing. A silicon type compound is widely used as a metal alkoxide compound, and a cured coating layer excellent in abrasion resistance can be formed. However, since adhesiveness between the cured coating layer and a substrate is poor, there is a defect of causing peeling or cracks.

As a method for improving these technical defects, there is a method comprising coating a mixture of a compound having an acryloyl group and colloidal silica on a substrate and curing the coating with an active energy ray such as ultraviolet light to form a transparent cured material layer excellent in resistance to scuffing (JP-A-61-181809). By using colloidal silica and a polymerization-curable compound in combination, a considerably high surface hardness and a satisfactory productivity can be achieved. However, still poor in respect of its surface resistance to scuffing as compared with the above mentioned method comprising coating a metal alkoxide compound on a substrate and curing.

Further, there is known a method of using polysilazane in place of the above mentioned silicon type metal alkoxide compound, i.e. a method of coating polysilazane on a substrate and curing by heat (JP-A-8-143689). It is considered that polysilazane causes a condensation reaction or an oxidation reaction in the presence of oxygen and is converted to silica (silicon dioxide) which may contain a nitrogen atom, and finally forms a silica layer containing substantially no nitrogen atom. The silica layer derived from polysilazane has a high surface hardness. However, this layer is poor in adhesiveness between the layer and a substrate in the same manner as in the case of using a metal alkoxide compound, and has a defect of easily causing peeling or cracks.

Still further, there is known a method of forming a silica surface layer by forming a protective layer on a plastic layer and coating polysilazane solution on its surface (JP-A-9-39161). The protective layer is provided to prevent the plastic film from being attacked by the solvent of the polysilazane solution.

It is known that the surface of the silica layer formed from polysilazane has abrasion resistance. However, the present inventors have found that surface properties such as abrasion resistance and resistance to scuffing on the surface of this silica layer vary depending on the material of its lower layer. It is considered that this is because the surface properties are influenced by adhesiveness between the silica layer and its lower layer and abrasion resistance of the surface of the lower layer in contact with the silica layer.

The present inventors have studied the material of a lower layer which imparts high surface properties to a silica layer surface, and have found a lower layer material having a specific material quality and surface properties. This lower layer material has a high adhesiveness to a silica layer, and also has a sufficient adhesiveness to a substrate. That is, the present inventors have discovered a transparent synthetic resin molded product having a transparent cured material layer having a surface abrasion resistance equivalent or close to glass and having a sufficient adhesiveness to an inner layer and also to a substrate although an outermost layer is an inorganic material layer. Thus, the present invention resides in the following molded product and the following methods of producing the same.

A transparent coated molded product comprising a transparent synthetic resin substrate and two or more transparent cured material layers provided on at least one part of the surface of the transparent synthetic resin substrate, wherein an inner layer in contact with the outermost layer of the two or more transparent cured material layers is an abrasion-resistant layer which is a cured material of an active energy ray-curable coating agent (A) containing a polyfunctional compound (a) having at least 2 active energy ray-curable polymerizable functional groups and the outermost layer is a silica layer which is a cured material of a curable coating agent (B) of polysilazane or a curable coating agent (B) containing polysilazane.

A method for preparing a transparent coated molded product comprising a transparent synthetic resin substrate and two or more transparent cured material layers provided on at least one part of the surface of the transparent synthetic resin substrate, wherein an inner layer in contact with the outermost layer of the two or more transparent cured material layers is an abrasion-resistant cured material layer of an active energy ray-curable coating agent (A) containing a polyfunctional compound (a) having at least 2 active energy ray-curable polymerizable functional groups and the outermost layer is a silica layer of a cured material of a curable coating agent (B) of polysilazane or a curable coating agent (B) containing polysilazane, the method comprising forming a cured material layer of the coating agent (A), forming an uncured material layer of the coating agent (B) on the surface of the cured material layer of the coating agent (A) and then curing.

A method for preparing a transparent coated molded product comprising a transparent synthetic resin substrate and two or more transparent cured material layers provided on at least one part of the surface of the transparent synthetic resin substrate, wherein an inner layer in contact with the outermost layer of the two or more transparent cured material layers is an abrasion-resistant cured material layer of an active energy ray-curable coating agent (A) containing a polyfunctional compound (a) having at least 2 active energy ray-curable polymerizable functional groups and the outermost layer is a silica layer of a cured material of a curable coating agent (B) of polysilazane or a curable coating agent (B) containing polysilazane, the method comprising forming an uncured or partially cured material layer of the coating agent (A), forming an uncured material layer of the coating agent (B) on the surface of the uncured or partially cured material layer of the coating agent (A), and curing the uncured or partially cured material of the coating agent (A) and the uncured material of the coating agent (B).

A method for preparing a bending-processed transparent coated molded product comprising a transparent synthetic resin substrate and 2 or more transparent cured material layers provided on at least one part of the surface of the transparent synthetic resin substrate, wherein an inner layer in contact with the outermost layer of the 2 or more transparent cured material layers is an abrasion-resistant cured material layer of an active energy ray-curable coating agent (A) containing a polyfunctional compound (a) having at least 2 active energy ray-curable polymerizable functional groups and the outermost layer is a silica layer of a cured material of a curable coating agent (B) of polysilazane or a curable coating agent (B) containing polysilazane, the method comprising forming a layer of an uncured, partially cured or cured material of the coating agent (A), forming a layer of an uncured or partially cured material of the coating agent (B) on the surface of the layer of the coating agent (A), subjecting the substrate having these layers to bending-processing, and then curing the uncured or partially cured material of the coating agent (B) and the uncured or partially cured material of the coating agent (A).

The transparent cured material layer in the present invention comprises at least 2 layers, and an outermost layer comprising a silica layer is not formed directly on a relatively soft transparent synthetic resin substrate, but is formed on an inner layer of a hard transparent cured material layer having a high abrasion resistance Therefore, a displacement of the outermost layer caused by an external force applied to a transparent coated molded product to make a scuffing becomes smaller, and therefore surface properties more satisfactory than surface properties imparted by an ordinary inorganic layer can be provided In the present invention, the transparent cured material layer comprises at least two layers including an outermost layer and an inner layer in direct contact with the outermost layer. There may be a third layer comprising other synthetic resin present between a transparent synthetic resin substrate (hereinafter simply referred to as "substrate") and a transparent cured material layer. For example, an adhesive layer or a thermoplastic resin layer such thermoplastic acrylic resin may be present. Generally, the transparent cured material comprises two layers of an inner layer and an outermost layer. The inner layer of the transparent cured material layer may comprise at least two layers of transparent cured materials of different kinds.

Among the transparent cured material layers, the inner layer in contact with the outermost layer is a cured material layer of an active energy ray-curable coating agent (A) having a high adhesiveness to the outermost layer and also having a high adhesiveness to a substrate. When a third layer is present between the inner layer and the substrate; the third layer should preferably have a satisfactory adhesiveness to both layers. Further, the inner layer has a satisfactory abrasion resistance.

The inner layer preferably has an abrasion resistance expressed by a haze value of at most 15% after 100 rotations (difference between a haze value after abrasion test and a haze value before abrasion test) according to abrasion resistance test of JIS R 3212. The abrasion resistance test is carried out with regard to a test piece having a cured material layer of coating agent (A) formed on a substrate (not necessarily a substrate). Since the transparent coated molded product of the present invention has an outermost layer formed on this cured material layer, it is difficult to apply the transparent coated molded product itself to the abrasion resistance test of the inner layer. The inner layer has more preferably an abrasion resistance expressed by a haze vale of at most 10%, most preferably at most 5% after 100 rotations.

In order to obtain an inner layer having a satisfactory adhesiveness and a high abrasion resistance, a polyfunctional compound (a) is used as an active energy ray-curable coating agent (A). Further, it is preferable to use a specific polyfunctional compound (a) in order to obtain a cured material having a higher abrasion resistance. The preferable specific polyfunctional compound (a) is described hereinafter with regard to a preferable polyfunctional compound (a). Also, in order to form a cured material having a high abrasion resistance in the same manner as mentioned above, it is preferable to form a cured material containing colloidal silica by blending colloidal silica having an average particle size of at most 200 nm with coating agent (A). Further, in order to efficiently cure a polyfunctional compound (a) with an active energy ray (particularly ultraviolet ray), coating agent (A) generally contains a photopolymerization initiator. Also, the term "polyfunctional" means to have at least 2 polymerizable functional groups curable with an active energy ray. Still further, depending on an object, it is possible to incorporate other additives. Thus, coating agent (A) is a curable composition generally containing a polyfunctional compound (a).

A polyfunctional compound (a) having at least 2 polymerizable functional groups curable with an active energy ray in coating agent (A) may be one kind of polyfunctional compound or plural kinds of polyfunctional compounds. When plural kinds of polyfunctional compounds are used, the compounds may be different compounds belonging to the same genre or different compounds belonging to different genres. For example, they may be a combination of different compounds, each of which belongs to acrylurethane described below, or they may be a combination of different compounds, one of which is acrylurethane and the other which is an acrylate compound having no urethane bond.

Examples of an active energy ray-curable polymerizable functional group in the polyfunctional compound having at least 2 active energy ray-curable polymerizable functional groups, include an addition-polymerizable unsaturated group such as a (meth)acryloyl group, a vinyl group and an allyl group or a group having the same, preferably a (meth) acryloyl group. Thus, a preferable example of a polyfunctional group includes a compound having at least 2 polymerizable functional groups of at least one kind selected from (meth)acryloyl groups. Among them, an acryloyl group easily polymerizable with ultraviolet light is particularly preferable.

Also, the polyfunctional compound may be a compound having at least 2 polymerizable functional groups of at least 2 kinds in total in a molecule, or may be a compound having at least 2 polymerizable functional groups of the same kind in total in a molecule. The number of polymerizable functional groups in one molecule of the polyfunctional compounds is at least 2, and is not specially limited, but usually from 2 to 50, preferably from 3 to 30.

In the present specification, an acryloyl group and a methacryloyl group are expressed generally as a (meth) acryloyl group, and this expression is the same as in the cases of a (meth)acryloyloxy group, a (meth)acrylic acid, a (meth)acrylate and the like. Further, among these groups or compounds, more preferable examples include those having an acryloyl group, such as an acryloyloxy group, an acrylic acid, an acrylate and the like.

Preferable examples of a polyfunctional compound (a) include a compound having at least 2 (meth)acryloyl groups. Among them, an ester compound having at least 2 (meth) acryloyloxy groups, i.e. a polyester of (meth)acrylic acid with a compound having at least 2 hydroxyl groups such as a polyhydric alcohol, is preferable.

Coating agent (A) may contain at least 2 polyfunctional compounds as a polyfunctional compound (a) Also, in addition to the polyfunctional compounds, it may contain a monofunctional compound having one polymerizable functional group polymerizable with an active energy ray. The term "monofunctional" means to have one polymerizable functional group curable with an active energy ray, and may have a functional group other than a polymerizable functional group. As a example of a monofunctional compound, a compound having a (meth)acryloyl group, particularly a compound having an acryloyl group, is preferable.

The case of using this monofunctional compound in coating agent (A), the proportion of this monofunctional compound to the total amount of a polyfunctional compound (a) and this monofunctional compound is not specially limited, but preferably from 0 to 60 wt %. If the proportion of a monofunctional compound is too large, hardness of a cured coating layer becomes lowered and abrasion resistance becomes unsatisfactory. A more preferable proportion of a monofunctional compound to the total amount of a polyfunctional compound (a) and a monofunctional compound is from 0 to 30 wt %.

A polyfunctional compound (a) may be a compound having various functional groups or bonds other than polymerizable functional groups. For example, it may have a hydroxyl group, a carboxyl group, a halogen atom, a urethane bond, an ether bond, an ester bond, a thioether bond, an amino bond, a diorganosiloxane bond or the like. Particularly, a (meth)acryloyl group-containing compound having a urethane bond (i.e., acrylurethane) and a (meth) acrylate compound having no urethane bond are preferable. Hereinafter, these two kinds of polyfunctional compounds are explained.

Examples of a (meth)acryloyl group-containing compound having a urethane bond (hereinafter referred to as "acrylurethane") include (1) a reaction product of a compound (X1) having a (meth)acryloyl group and a hydroxyl group and a compound having at least 2 isocyanate groups (hereinafter referred to as "polyisocyanate"), (2) a reaction product of a compound (X1), a compound (X2) having at least 2 hydroxyl groups and polyisocyanate, (3) a reaction product of a compound (X2) and a compound (X3) having a (meth)acryloyl group and an isocyanate group, and the like. In these reaction products, it is preferable that an isocyanate group is not present, but a hydroxyl group may be present. Therefore, in the preparation of these reaction products, it is preferable that the total mol number of hydroxyl groups in all reaction starting materials is equivalent to or more than the total mol number of isocyanate groups.

Examples of the compound (X1) having a (meth)acryloyl group and a hydroxyl group include a compound having one (meth)acryloyl group and one hydroxyl group, a compound having at least 2 (meth)acryloyl groups and one hydroxyl group, a compound having one (meth)acryloyl group and at least 2 hydroxyl groups, a compound having at least 2 (meth)acryloyl groups and at least 2 hydroxyl groups, and the like. Particular examples include 2-hydroxyethyl (meth) acrylate, trimethylolpropane di(meth)acrylate, trimethylolpropane mono(meth)acrylate and pentaerythritol di(meth) acrylate in the above order. These are a monoester of a compound having at least 2 hydroxyl groups and (meth) acrylic acid or a polyester having at least one hydroxyl group remained.

The compound (X1) may be a ring-opening reaction product of a compound having at least one epoxy group and (meth)acrylic acid. By reaction of an epoxy group and (meth)acrylic acid, the epoxy group is ring-opened to form an ester bond and a hydroxyl group, and a compound having a (meth)acryloyl group and a hydroxyl group is produced. Alternatively, an epoxy group of a compound having at least one epoxy group is ring-opened to produce a hydroxyl group-containing compound, which is then converted into a (meth)acrylate.

As a compound having at least one epoxy group, a monoepoxide having one epoxy group or a polyepoxide referred to as an epoxy resin is preferable. Preferable examples of the epoxide include a compound having at least 2 glycidyl groups such as polyhydric phenols-polyglycidylether (e.g. bisphenol A-diglycidylether) or a cycloaliphatic epoxy compound. Further, a reaction product of an epoxy group-containing (meth)acrylate and a hydroxyl or carboxyl group-containing compound can be used as a compound (X1). Examples of the epoxy group-containing (meth)acrylate include glycidyl (meth)acrylate.

As a polyepoxide, a commercially available epoxy resin such as glycidylether type polyepoxide or cycloaliphatic type polyepoxide may be used. Examples of the polyepoxide include bisphenol A-diglycidylether, bisphenol F-diglycidylether, tetrabromobisphenol A-diglycidylether, glycerin triglycidylether, novolak polyglycidylether, vinyl cyclohexenedioxide, dicyclopentadienedioxide, and the like.

Examples other than the above mentioned compounds (X1) include 2-hydroxypropyl(meth)acrylate, 1,3-propanediolmono(meth)acrylate, 1,4-butanediolmono (meth)acrylate, 2-butene-1,4-diolmono(meth)acrylate, 1,6-hexanediolmono(meth)acrylate, glyceloldi(meth)acrylate, pentaerythritoltri(meth)acrylate, dipentaerythritolmono(or penta)(meth)acrylate, polyethyleneglycolmono(meth) acrylate, polypropyleneglycolmono(meth)acrylate, a reaction product of bisphenol A-diglycidylether and (meth) acrylic acid, and the like.

Examples of polyisocyanates include an ordinary monomer type polyisocyanate, a polymer form or modified form of polyisocyanate, or prepolymer type compound such as isocyanate group-containing urethane prepolymer.

Examples of a polymer form of polyisocyanate include a trimer (isocyanurate-modified form), a dimer, a carbodiimide-modified form, and the like, and examples of the modified form of polyisocyanate include modified urethanes modified with a polyhydric alcohol such as trimethylolpropane, modified biuret, modified allophanate, modified urea, and the like. Examples of the prepolymer type compound include isocyanate group-containing urethane prepolymers obtained by reaction of polyisocyanate and polyol such as the following polyether polyol or polyester polyol. These polyisocyanates may be used in a combination of two or more.

Particular examples of the monomer type polyisocyanate (terms in parentheses [ ] are abbreviations) include 2,6-tolylenediisocyanate, 2,4-tolylenediisocyanate, methylenebis(4-phenylisocyanate) [MDI], 1,5-naphthalenediisocyanate, tolidine diisocyanate, hexamethylenediisocyanate, isophoronediisocyanate, p-phenylenediisocyanate, transcyclohexane-1,4-diisocyanate, xylylenediisocyanate [XDI], hydrogenated XDI, hydrogenated MDI, lysinediisocyanate, tetramethylxylenediisocyanate, trimethylhexamethylenediisocyanate, lysineestertriisocyanate, 1,6,11-undecanetriisocyanate, 1,8-diisocyanate-4-isocyanatemethyloctane, 1,3,6-hexamethylenetriisocyanate, bicycloheptanetriisocyanate, and the like.

A particularly preferable polyisocyanate is a polyisocyanate which is not colored yellow (polyisocyanate having no isocyanate group directly bonded to an aromatic nucleus), examples of which include an aliphatic polyisocyanate such as hexamethylenediisocyanate, a cycloaliphatic polyisocyanate such as isophorone diisocyanate, an aromatic polyisocyanate such as xylylenediisocyanate, and the like. As mentioned above, polymers or modified forms of these polyisocyanates are also preferable.

Examples of the compound (X2) having at least 2 hydroxyl groups include a polyhydric alcohol, a polyol having a molecular weight higher than a polyhydric alcohol, and the like.

Examples of the polyhydric alcohol include a polyhydric alcohol having 2 to 20 hydroxyl groups, preferably a polyhydric alcohol having 2 to 15 hydroxyl groups. The polyhydric alcohol may be an aliphatic polyhydric alcohol, or may be a cycloaliphatic polyhydric alcohol or a polyhydric alcohol having an aromatic nucleus.

Examples of the polyhydric alcohol having an aromatic nucleus include alkyleneoxide adducts of polyphenols, ring-opened products of polyepoxides having an aromatic nucleus such as polyphenols-polyglycidylethers, and the like.

Examples of the polyol having a high molecular weight include polyether polyol, polyester polyol, polyetherester polyol, polycarbonate polyol, and the like. Also, as a polyol, a hydroxyl group-containing vinyl polymer may be used. These polyhydric alcohols and polyols may be used in a combination of two or more.

Particular examples of the polyhydric alcohol include ethyleneglycol, 1,2-propyleneglycol, 1,3-propanediol, 1,3-butanediol, 1,4-butanediol, 1,6-hexanediol, diethyleneglycol,-dipropyleneglycol, neopentylglycol, 2,2,4-trimethyl-1,3-pentanediol, cyclohexanediol, dimethylolcyclohexane, trimethylolpropane, glycerin, pentaerythritol, ditrimethylolpropane, dipentaerythritol, tris(2-hydroxyethyl)isocyanurate, tris(2-hydroxypropyl)isocyanurate, 3,9-bis(hydroxymethyl)-2,4,8,10-tetraoxaspiro[5.5]undecane, 3,9-bis(2-hydroxy-1,1-dimethylethyl)-2,4,8,10-tetraoxaspiro[5.5]undecane, ring-opened material of bisphenol A-diglycidylether, ring-opened material of vinyl cyclohexenedioxide, and the like.

Particular examples of polyols include a polyether polyol such as polyethyleneglycol, polypropyleneglycol, bisphenol A-alkyleneoxide adduct or polytetraethyleneglycol, an aliphatic polyol such as polybutadienediol or hydrogenated polybutadienediol, poly ε-caprolactonepolyol, a polyester-polyol obtained by reaction of the above polyhydric alcohol and a polybasic acid such as adipic acid, sebacic acid, phthalic acid, maleic acid, fumaric acid, azelaic acid or glutaric acid, a polycarbonatediol obtained by reaction of phosgene and 1,6-hexanediol, and the like.

Examples of the hydroxyl group-containing vinyl polymer include copolymers of a monomer containing no hydroxyl group (such as olefin) and a hydroxyl group-containing monomer (such as allylalcohol, vinyl alcohol, hydroxyalkylvinyl ether or hydroxyalkyl(meth)acrylate), and the like.

Examples of the compound (X3) having a (meth)acryloyl group and an isocyanate group include 2-isocyanateethyl (meth)acrylate, methacryloylisocyanate, and the like.

Hereinafter, a (meth)acrylate compound having no urethane bond is explained below.

Examples of a (meth)acrylate compound having no urethane bond preferable as a polyfunctional compound (a), include a polyester of (meth)acrylic acid and a compound having at least 2 hydroxyl groups in the same manner as the above mentioned compound (X2). Preferable examples of the compound having at least 2 hydroxyl groups include the above mentioned polyhydric alcohols or polyols. Further, preferable examples include a (meth)acrylate compound which is a reaction product of (meth)acrylic acid and a compound having at least 2 epoxy groups. As the compound having at least 2 epoxy groups, the above mentioned polyepoxides can be used.

Particular examples of a polyfunctional compound containing no urethane bond are illustrated below. (Meth)acrylates of aliphatic polyhydric alcohols such as 1,4-butanedioldi(meth)acrylate, neopentylglycoldi(meth)acrylate, 1,6-hexanedioldi(meth)acrylate, a di(meth)acrylate of a long chain aliphatic diol having a carbon number of 14 to 15, 1,3-butanedioldi(meth)acrylate, ethyleneglycoldi(meth)acrylate, diethyleneglycoldi(meth)acrylate, glyceroltri(meth)acrylate, glyceroldi(meth)acrylate, triglyceroldi(meth)acrylate, trimethylolpropanetri(meth)acrylate, ditrimethylolpropanetetra(meth)acrylate, pentaerythritoltri(meth)acrylate, pentaerythritoltetra(meth)acrylate, dipentaerythritolhexa(meth)acrylate, dipentaerythritolpenta(meth)acrylate, a di(meth)acrylate of a triol comprising a condensate of neopentylglycol and trimethylolpropane, and the like.

(Meth)acrylates of polyhydric phenols or polyhydric alcohols having an aromatic nucleus or triazine nucleus such as tris(2-(meth)acryloyloxyethyl)isocyanurate, bis(2-(meth)acryloyloxyethyl)-2-hydroxyethylisocyanurate, tris(2-(meth)acryloyloxypropyl)isocyanurate, bis(2-(meth)acryloyloxyethyl)bisphenol A, bis(2-(meth)acryloyloxyethyl)bisphenol S, bis(2-(meth)acryloyloxyethyl)bisphenol F, bisphenol A dimethacrylate, and the like.

Hydroxy group-containing compound-alkylene oxide adduct-(meth)acrylate, hydroxy group-containing compound-caprolactone adduct-(meth)acrylate, polyoxyalkylene polyol-(meth)acrylate. In the following compounds, EO represents "ethylene oxide", and PO represents "propylene oxide", and the numbers in the parentheses [ ] indicate molecular weights of polyoxyalkylene polyol. Trimethylolpropane-EO adduct-tri(meth)acrylate, trimethylolpropane-PO adduct-tri(meth)acrylate, triethyleneglycoldi(meth)acrylate, tetraethyleneglycoldi(meth)acrylate, tripropyleneglycoldi(meth)acrylate, dipentaerythritol-caprolactone adduct-hexa(meth)acrylate, tris(2-hydroxyethyl)isocyanurate-caprolactone adduct-tri(meth)acrylate, polyethyleneglycol[200–1000]di(meth)acrylate, polypropyleneglycol[200–1000]di(meth)acrylate, tris(2-hydroxyethyl)isocyanurate-caprolactone adduct-tri(meth)acrylate, and the like.

The following (meth)acryloyl group-containing carboxylate or phosphate such as bis(acryloyloxyneopentylglycol) adipate, hydroxypivalic acid neopentylglycolester-di(meth)acrylate, hydroxypivalic acid neopentylglycolester-caprolactone adduct-di(meth)acrylate, bis(2-(meth)acryloyloxyethyl)phosphate, tris(2-(meth)acryloyloxyethyl) phosphate, and the like.

The following polyepoxide-(meth)acrylic acid adduct (wherein one molecule of (meth)acrylic acid is adducted per one epoxy group of epoxide), and reaction product of glycidyl(meth)acrylate and polyhydric alcohol or polycarboxylic acid (wherein at least two molecules of glycidyl (meth)acrylate are reacted per one molecule of polyhydric alcohol or the like) such as bisphenol A-diglycidyl ether-(meth)acrylic acid adduct, vinyl cyclohexenedioxide-(meth) acrylic acid adduct, dicyclopentadiene dioxide-(meth) acrylic acid adduct, glycidyl(meth)acrylate-ethyleneglycol reaction product, glycidyl(meth)acrylate-propyleneglycol reaction product, glycidyl(meth)acrylate-diethyleneglycol reaction product, glycidyl(meth)acrylate-1,6-hexanediol reaction product, glycidyl(meth)acrylate-glycerol reaction product, glycidyl(meth)acrylate-trimethylolpropane reaction product, glycidyl(meth)acrylate-phthalic acid reaction product, and the like.

Alkylether-modified products, alkenylether-modified products and carboxylate-modified products of such compounds having unreacted hydroxyl groups as the above mentioned (meth)acrylates (hereinafter referred to as "modified product") such as alkyl-modified dipentaerythritol penta(meth)acrylate, alkyl-modified dipentaerythritol tetra(meth) acrylate, alkyl-modified dipentaerythritol tri(meth)acrylate, vinyl cyclohexenedioxide-(meth)acrylic acid adduct-allylether-modified product, vinyl cyclohexenedioxide-(meth)acrylic acid adduct-methylether-modified product, stearic acid-modified pentaerythritol di(meth)acrylate, and the like.

In order for a cured material of coating agent (A) to provide a satisfactory abrasion resistance, it is preferable that at least one part (preferably at least 30 wt %) of a polyfunctional compound (a) is at least tri-functional polyfunctional compound. Preferably at least 50 wt % of a polyfunctional compound (a) is at least tri-functional polyfunctional compound. Examples of a preferable polyfunctional compound (a) include the following acrylurethane and polyfunctional compounds having no urethane bond.

Examples of the acrylurethane include preferably at least 3-functional (preferably 4–20 functional) acrylurethane compound which is a reaction product of hydroxyalkyl (meth)acrylate, polyisocyanate and pentaerythritol or polypentaerythritol, or a reaction product of polyisocyanate and a hydroxyl group-containing poly(meth)acrylate of pentaerythritol or polypentaerythritol, and the like.

Examples of the polyfunctional compound containing no urethane bond includes preferably pentaerythritol type poly(meth)acrylate, isocyanurate type poly(meth)acrylate, and the like. The pentaerythritol type poly(meth)acrylate is a polyester (preferably 4–20-functional) of (meth)acrylic acid and pentaerythritol or polypentaerythritol. The isocyanurate type poly(meth)acrylate is a polyester (2–3-functional) of (meth)acrylic acid and tris(hydroxyalkyl)isocyanurate or an addition product of 1 mol of the isocyanurate and 1–6-mols of caprolactone or alkyleneoxide. It is preferable to use these preferable polyfunctional compounds with other at least 2-functional compounds (particularly, poly(meth)acrylate of polyhydric alcohol) in combination. These preferable polyfunctional compounds are used preferably in an amount of at least 30 wt %, more preferably at least 50 wt %, to the total amount of polyfunctional compounds (a).

Examples a monofunctional compound usable with a polyfunctional compound (a) include preferably a compound having one (meth)acryloyl group in a molecule. Such a monofunctional compound may contain a functional group such as a hydroxyl group, an epoxy group or the like. Preferable examples of the monofunctional compounds include (meth)acrylic acid ester, i.e. (meth)acrylate.

Particular examples of the monofunctional compounds includes methyl(meth)acrylate, ethyl(meth)acrylate, butyl(meth)acrylate, isobutyl(meth)acrylate, t-butyl(meth)acrylate, 2-ethylhexyl(meth)acrylate, lauryl(meth)acrylate, tridecyl(meth)acrylate, cyclohexyl(meth)acrylate, 2-hydroxyethyl(meth)acrylate, 2-hydroxypropyl(meth)acrylate, glycidyl(meth)acrylate, tetrahydrofurfuryl(meth)acrylate, benzyl(meth)acrylate, 1,4-butyleneglycolmono(meth)acrylate, ethoxyethyl(meth)acrylate, phenylglycidylether-(meth)acrylic acid adduct, and the like.

In order to raise abrasion resistance and hardness of a transparent cured material layer in direct contact with an outermost layer, coating agent (A) may contain an effective amount of colloidal silica having an average particle size of at most 200 nm. The average particle size of the colloidal silica is preferably from 1 to 100 nm, more preferably from 1 to 50 nm. In view of improvement on dispersion stability of colloidal silica and adhesiveness between colloidal silica and a polyfunctional compound, the colloidal silica is preferably the following surface-modified colloidal silica (hereinafter referred to simply as "modified colloidal silica").

When using colloidal silica, in order to fully achieve its effect, the colloidal silica is used in an amount of preferably at least 5 parts by weight, more referably at least 10 parts by weight, to 100 parts by weight of a curable component (the total amount of a polyfunctional compound and a monofunctional compound) of a transparent cured material layer. If the amount of colloidal silica is too small, a satisfactory abrasion resistance (the main purpose of blending colloidal silica) can not be obtained. On the other hand, if the amount of colloidal silica is too large, a coating layer is liable to cause haze, and cracks easily occur when a transparent coated molded product is subjected to secondary processing such as thermal bending processing. Thus, the upper limit of the amount of colloidal silica in a transparent curing material layer is preferably 300 parts by weight to 100 parts by weight of a curable component. A more preferable amount of colloidal silica is from 50 to 250 parts by weight to 100 parts by weight of a curable component.

As colloidal silica, it is possible to use surface-unmodified colloidal silica, but it is more preferable to use modified-colloidal silica. Modified-colloidal silica improves dispersion stability of colloidal silica in composition. It is considered that an average particle size of colloidal silica particles does not substantially change or is enlarged a little by modification, but an average particles size of the modified colloidal silica obtained is considered to be within the above mentioned range. Hereinafter, the modified colloidal silica is explained.

Unmodified colloidal silica which is a starting material for modified colloidal silica is available in an acidic or basic dispersion form. Any form of colloidal silica is usable, but when a basic colloidal silica is used, it is preferable to make a dispersion acidic by adding an organic acid so as to prevent gelation of a curable composition for a transparent cured material layer or to prevent precipitation of silica from colloidal silica dispersion system.

Various dispersion media are known as a dispersion medium for colloidal silica, and a dispersion medium for a starting colloidal silica is not specially limited. If necessary, modification can be carried out by changing a dispersion medium or a dispersion medium can be changed after modification. It is preferable to use a medium (solvent) of a curable composition for a transparent cured material layer in direct contact with a substrate as a dispersion medium for a modified colloidal silica. The medium of a curable composition for a transparent cured material layer in direct contact with a substrate is preferably a solvent having a relatively low boiling point, i.e. an ordinary solvent for a paint, in view of drying property. When considering easy production, it is preferable that all of a dispersion medium for a starting colloidal silica, a dispersion medium for a modified colloidal silica and a medium for a curable composition of a transparent cured material layer are the same medium (solvent). For such a solvent, it is preferable to use an organic medium widely used as a solvent for a paint.

Examples of such a dispersion medium include water, lower alcohols such as methanol, ethanol, 2-propanol, n-butanol, 2-methylpropanol, 4-hydroxy-4-methyl-2-pentanone, ethyleneglycol or the like, cellosolves such as methylcellosolve, ethylcellosolve, butylcellosolve or the like, dimethylacetamide, toluene, xylene, methyl acetate, ethyl acetate, butyl acetate, acetone, and the like.

As mentioned above, an organic dispersion medium is preferable for such a dispersion medium, and among the above mentioned organic dispersion media, alcohols and cellosolves are particularly preferable. A mixture of colloidal silica and a dispersion medium having the colloidal silica dispersed therein is referred to as "colloidal silica dispersion".

Modification of a colloidal silica is carried out preferably by using a compound having a hydrolyzable silicon group or a silicon group having a hydroxyl group bonded thereto (hereinafter referred to as "modifier"). Hydrolysis of the hydrolyzable silicon group generates a silanol group, which is considered to react with a silanol group present on the surface of a colloidal silica, thereby bonding the modifier to the surface of a colloidal silica. A modifier may be used in a combination of two or more. As mentioned below, it is possible to use a reaction product obtained by reacting two kinds of modifiers having mutually reactive functional groups as a modifier.

A modifier may have at least 2 hydrolyzable silicon groups or silanol groups, or may be a partially hydrolyzed condensate of a compound having a hydrolyzable silicon group or a partially condensed product of a compound having a silanol group. It is preferable to use a compound having one hydrolyzable silicon group as a modifier (a partially hydrolyzed condensate may be formed during modification treatment). Also, it is preferable that a modifier has an organic group bonded to a silicon atom and at least one of the organic groups is an organic group having a reactive functional group.

A preferable modifier is a compound represented by the following formula 1, which is generally called as a silane coupling agent.

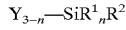

formula 1 wherein Y is a hydrolyzable group, $R^1$ is a monovalent organic group having no reactive functional group, $R^2$ is a monovalent organic group having a reactive functional group, and n is 0, 1 or 2.

Examples of the hydrolyzable group Y include a halogen atom, an alkoxy group, an acyloxy group, a carbamoyl group, an amino group, an aminoxy group, a ketoxymate group, and the like, and a preferable example is an alkoxy group. The alkoxy group is preferably an alkoxy group having a carbon number of at most 4, preferably a methoxy group and an ethoxy group. n is preferably 0 or 1. Further, the above mentioned compound having a silanol group is also represented by the above mentioned formula 1 wherein Y is a hydroxyl group.

Examples of the monovalent organic group $R^1$ having no reactive functional group include a hydrocarbon group having a carbon number of at most 18 such as an alkyl group, an aryl group, an aralkyl group, and the like. The hydrocarbon group is preferably a hydrocarbon group having a carbon number of at most 8, more preferably an alkyl group having a carbon number of at most 4. Particularly preferable examples of $R^1$ include a methyl group and an ethyl group. The term "monovalent organic group" used herein means an organic group bonded to a silicon atom by way of a carbon atom (this definition is applied also to $R^2$).

Examples of a monovalent organic group $R^2$ having a reactive functional group include a hydrocarbon group having a carbon number of at most 18 such as an alkyl group, an aryl group, an aralkyl group, and the like, which have a reactive functional group. This organic group may have at least 2 reactive functional groups. Examples of the reactive functional group include an amino group, a mercapto group, an epoxy group, an isocyanate group, a polymerizable unsaturated group, and the like.

The polymerizable unsaturated group may be $R^2$ itself (such as a vinyl group), or may be a polymerizable unsaturated group which is bonded with an organic group such as a (meth)acryloyloxy group or a vinyloxy group to form $R^2$. The amino group may be either primary or secondary amino group, and in the case of the secondary amino group, an organic group bonded to its nitrogen atom is preferably an alkyl group, an aminoalkyl group, an aryl group, and the like (more preferably an alkyl group having a carbon number of at most 4, an aminoalkyl group having a carbon number of at most 4 and a phenyl group). Preferable examples of the reactive functional group include an amino group, a mercapto group, an epoxy group and a (meth)acryloyloxy group. The reactive functional group is bonded to an organic group, examples of which include a phenylene group or an alkylene group having a carbon number of at most 8 (except for the carbon number of the functional group), more preferably an alkylene group having a carbon number of from 2 to 4 (particularly polymethylene group).

Examples of the modifier include the following compounds which are classified depending on a kind of a reactive functional group as listed below (Meth)acryloyloxy group-containing silanes: 3-(meth)acryloyloxypropyltrimethoxysilane, 3-(meth)acryloyloxypropyltriethoxysilane, 3-(meth)acryloyloxypropylmethyldimethoxysilane, and the like.

Amino group-containing silanes: 3-aminopropyl trimethoxysilane, 3-aminopropyltriethoxysilane, 3-aminopropylmethyl dimethoxysilane, N-(2-aminoethyl)-3-aminopropyl trimethoxysilane, N-(2-aminoethyl)-3-aminopropylmethyl dimethoxysilane, N-(2-aminoethyl)-3-aminopropyl triethoxysilane, 3-ureidopropyltriethoxysilane, N-(N-vinylbenzyl-2-aminoethyl)-3-aminopropyl trimethoxysilane, 3-anilinopropyltrimethoxysilane, and the like.

Mercapto group-containing silanes: 3-mercaptopropyl trimethoxysilane, 3-mercaptopropyltriethoxysilane, 3-mercaptopropylmethyldimethoxysilane, 3-mercaptopropylmethyldiethoxysilane, and the like.

Epoxy group-containing silanes: 3-glycidoxypropyl trimethoxysilane, 3-glycidoxypropylmethyl dimethoxysilane, 3-glycidoxypropyltriethoxysilane, and the like.

Isocyanate group-containing silanes: 3-isocyanatepropyltrimethoxysilane, 3-isocyanatepropyl triethoxysilane, 3-isocyanatepropylmethyl dimethoxysilane, 3-isocyanatepropylmethyldiethoxysilane, and the like.

Examples of the reaction product obtained by reacting 2 kinds of modifiers having mutually reactive functional groups include reaction products of amino group-containing silanes and epoxy group-containing silanes, reaction products of amino group-containing silanes and (meth) acryloyloxy group-containing silanes, reaction products of epoxy group-containing silanes and mercapto group-containing silanes, reaction products of two molecules of mercapto group-containing silanes, and the like.

Modification of colloidal silica is generally conducted by making a modifier having a hydrolyzable group in contact with a colloidal silica to carry out hydrolysis. For example, modification can be carried out by adding a modifier to a colloidal silica dispersion and hydrolyzing the modifier in the colloidal silica dispersion.

In such a case, the hydrolyzed product of the modifier is considered to be chemically or physically bonded to the surface of colloidal silica particles, thereby modifying the surface. Particularly, since a silanol group is generally present on the surface of colloidal silica, the silanol group present on the surface of colloidal silica is condensed with a silanol group formed by hydrolysis of the modifier, thereby providing a surface having the hydrolyzed residue of the modifier bonded thereto. Also, there is a case that the hydrolyzed products themselves are condensed with each other and are bonded to the surface of colloidal silica particles. In the present invention, it is possible to conduct modification by previously hydrolyzing a modifier to some extent and then adding the partially hydrolyzed modifier to a colloidal silica dispersion.

When modifying the surface of colloidal silica with a modifier having a hydrolyzable group, the modifier is mixed with a colloidal silica dispersion and is hydrolyzed with water in the system or newly added water to provide a modified colloidal silica having the surface modified with the hydrolyzed product. In order to effectively accelerate the hydrolysis reaction of a modifier and the reaction of a modifier or its partially hydrolyzed condensate with a silanol group on the surface of colloidal silica, it is preferable to make a catalyst present therein. Also, in the case of using a modifier having a silanol group, it is-preferable for accelerating reaction of silanol groups themselves to make a catalyst present therein.

Such a catalyst is acid or alkali, and is preferably selected from an inorganic acid or an organic acid. Examples of the inorganic acid include a hydrohalogenic acid such as hydrochrolic acid, hydrofluoric acid or hydrobromic acid, sulfuric acid, nitric acid, phosphoric acid, and the like. Examples of the organic acid include formic acid, acetic acid, oxalic acid, acrylic acid, methacrylic acid, and the like.

Hydrolysis reaction is usually conducted in a solvent in order to uniformly carry out the reaction. Such a solvent is usually a dispersion medium for a starting colloidal silica dispersion. However, a solvent other than this dispersion medium or a mixture solvent of other solvent with dispersion medium may be used. Preferable conditions for such a solvent are to dissolve a modifier, to have a compatibility with water and a catalyst and to prevent agglomeration of colloidal silica.

Examples of such a solvent include water; lower alcohols such as methanol, ethanol, 2-propanol or n-butanol; ketones such as acetone, methylisobutylketone or methylethylketone, ethers such as tetrahydrofuran or dioxane, cellosolves such as methylcellosolve, ethylcellosolve or butylcellosolve; dimethylacetamide, and the like.

The above mentioned dispersion medium for colloidal silica may be used as it is for this solvent, or may be substituted with a solvent other than the dispersion medium. Also, a necessary amount of a solvent other than the dispersion medium may be newly added to the dispersion medium.

A reaction temperature is preferably in the range of from room temperature to a boiling point of a solvent used, and a reaction time is preferably in the range of from 0.5 to 24 hours although it depends on a temperature used.

In the modification of colloidal silica, an amount of a modifier is not specially limited, but is preferably from 1 to 100 parts by weight to 100 parts by weight of colloidal silica (solid content in dispersion). If the amount of a modifier is less than 1 part by weight, the surface of colloidal silica is not effectively modified. On the other hand, if the amount of a modifier exceeds 100 parts by weight, an unreacted modifier and a hydrolyzed material or a condensate of a modifier not carried on the surface of colloidal silica are present in a large amount, and these materials work as a chain transfer agent during curing a curable composition for a transparent coating layer or work as a plasticizer for the coating layer after curing, thereby lowering a hardness of a cured coating layer.

In order to cure a polyfunctional compound (a) as mentioned above, a coating agent (A) generally contains a photopolymerization initiator. A well known photopolymerization initiator is usable for this purpose, and easily commercially available photopolymerization initiators are preferable. A plurality of photopolymerization initiators may be used in a transparent curable material layer.

Examples of the photopolymerization initiator include an aryl ketone type photopolymerization initiator (such as acetophenones, benzophenones, alkylaminobenzophenones, benzyls, benzoins, benzoinethers, benzyldimethylketals, benzoylbenzoates and α-acyloxymesters), a sulfur-containing type photopolymerization initiator (such as sulfides and thioxanthones), an acylphosphine oxide type photopolymerization initiator, an acylphosphinate type photopolymerization initiator, an acylphosphonate type photopolymerization initiator, and other photopolymerization initiators. Particularly, thioxanthones, an acylphosphine oxide type photopolymerization initiator, an acylphosphinate type photopolymerization initiator and an acylphosphonate type photopolymerization initiator have a maximum absorption wavelength in the range of from 365 to 400 nm, and polymerization can be initiated with a ultraviolet light having a wavelength different from a wavelength absorbed by the following ultraviolet light absorbers. Therefore, the function of these photopolymerization initiators is not impaired even when a ultraviolet light absorber is present in a coating agent (A). The most preferable photopolymerization initiator is an acylphosphine oxide type photopolymerization initiator. A photopolymerization initiator may be used in combination with a photosensitizer such as amines.

Particular examples of a photopolymerization initiator are illustrated below.

4-phenoxydichloroacetophenone, 4-t-butyl-dichloroacetophenone, 4-t-butyl-trichloroacetophenone, diethoxyacetophenone, 2-hydroxy-2-methyl-1-phenylpropane-1-one, 1-(4-isopropylphenyl)-2-hydroxy-2-methylpropane-1-one, 1-(4-dodecylphenyl)-2-methylpropane-1-one, 1-(4-(2-hydroxyethoxy)phenyl)-2-hydroxy-2-metylpropane-1-one, 1-hydroxycyclohexylphenylketone, 2-methyl-1-{4-(methylthio)phenyl}-2-morpholinopropane-1-one;

benzil, benzoin, benzoinmethylether, benzoinethylether, benzoinisopropylether, benzoinisobutylether, benzildimethylketal, benzophenone, benzoylbenzoic acid, methyl benzoylbenzoate, 4-phenylbenzophenone, hydroxybenzophenone, acrylated benzophenone, 3,3'-dimethyl-4-methoxybenzophenone, 3,3',4,4'-tetrakis(t-butylperoxycarbonyl)benzophenone, 9,10-phenanthrenequinone, camphorquinone, dibenzosuberone, 2-ethylanthraquinone, 4',4"-diethylisophthalophenone, α-acyloxymester, methylphenylglyoxylate;

4-benzyol-4'-methyldiphenylsulfide, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone;

2,4,6-trimethylbenzoyldiphenylphosphine oxide, benzoyldiphenylphosphine oxide, 2,6-dimethylbenzoyldiphenylphosphine oxide, bis(2,6-dimethoxybenzoyl)-2,4,4-trimethylpentylphosphine oxide, bis(2,4,6-trimethylbenzoyl)phenylphosphine oxide; and ethyl 2,4,6-trimethylbenzoylphenylphosphinate, methyl 2,4,6-trimethylbenzoylphenylphosphinate, isopropyl 2,4,6-trimethylbenzoylphenylphosphinate, dimethyl 2,4,6-trimethylbenzoylphosphonate, diethyl 2,4,6-trimethylbenzoylphosphonate.

An amount of a photopolymerization initiator in a coating agent (A) is preferably from 0.01 to 20 parts by weight, more preferably from 0.1 to 10 parts by weight, to 100 parts by weight of a curable component (the total amount of a polyfunctional compound (a) and a monofunctional compound).

The coating agent (A) may contain various agents in addition to the above basic components. Further, it is essential for a coating solution for forming a layer of a coating agent (A) to contain a solvent, and it is indispensable for the coating-solution to use a solvent unless a polyfunctional compound is specially a liquid of low viscosity. For this solvent, it is possible to use a solvent generally used for a coating agent comprising a polyfunctional compound (a) as a curable component. Also, a dispersion medium for a starting colloidal silica can be used as it is as a solvent. Still further, it is preferable to use an appropriate solvent selected depending on a kind of a substrate.

An amount of a solvent can be optionally varied depending on an aimed viscosity of a coating solution, an aimed thickness of a cured coating layer, drying temperature conditions and the like. The solvent is used generally in an amount of at most 100 times weight, preferably 0.1–50 times weight, to a curable component of a coating solution. A layer of a coating agent (A) is formed on the surface of a substrate by coating a coating solution and then removing a solvent by heat or the like (generally referred to as "drying").

Examples of the solvent include lower alcohols, ketones, ethers, cellosolves, and the like, which are illustrated above as a solvent used for hydrolysis to modify a colloidal silica. Other examples of the solvent include esters such as n-butyl acetate, diethyleneglycol monoacetate or the like, halogenated hydrocarbons, hydrocarbons, and the like. It is suitable to use lower alcohols, cellosolves, esters, or mixture thereof for coating an aromatic polycarbonate resin having a low solvent resistance.

A coating agent (A) may optionally contain various additives, if necessary. Examples of the additives include stabilizers such as an ultraviolet light absorber, a light stabilizer, an antioxidant and a heat polymerization inhibitor, surfactants such as a leveling agent, a defoaming agent, a thickening agent, an anti-settling agent, a dispersant, an antistatic agent and an anti-fogging agent, curing catalysts such as acid, alkali and salts, an infrared light absorber, a dye, a pigment, a filler, and the like. Among them, an additive such as a filler which is hardly soluble in a coating agent (A) or a solvent, should preferably be fine particles so as not to impair a transparency of a cured material layer.

It is particularly preferable that a coating agent (A) contains an ultraviolet light absorber. An ultraviolet light absorber not only prevents coloration or degradation of a substrate by ultraviolet light but also prevents a polymer chain in a coating composition from splitting. Particular, in the present invention, the addition of an ultraviolet light absorber is effective for preventing degradations of a chemical bonding in the vicinity of the interface between an outermost layer and its lower inner layer and a covalent bonding formed between an outermost layer and an inner layer, and also effective for securing a satisfactory adhesive force between layers and preventing occurrence of cracking.

In the present invention, an ultraviolet light absorber is not specially limited so long as it is soluble in a coating agent, and various ultraviolet light absorbers are usable. Also, ultraviolet light absorbers can be used in a combination of two or more.

When a coating agent (A) contains an ultraviolet light absorber, its amount is preferably from 0.1 to 50 parts by weight, more preferably from 1 to 30 parts by weight, to 100 parts by weight of a curable component (total amount of a polyfunctional compound (a) and a monofunctional compound) in a coating agent (A). Also, it is preferable that a part or the whole part of an ultraviolet light absorber is a polymerizable ultraviolet light absorber. By using the polymerizable ultraviolet light absorber, breeding out of the ultraviolet light absorber on the surface of a cured material layer can be avoided and a scuff resistance is not lowered even when a relatively large amount of the ultraviolet light absorber is incorporated in a coating agent (A). However, even when using a polymerizable ultraviolet light absorber, if its amount exceeds the above mentioned upper limit, curability of a coating agent (A) tends to be lowered and physical properties of a cured material are lowered.

A polymerizable ultraviolet light absorber is a compound having at least one polymerizable functional group which is the same as a polymerizable functional group of a polyfunctional compound (a) and having a structure having an ultraviolet light-absorbing performance. Preferably, a polymerizable ultraviolet light absorber has a (meth)acryloyl group as a polymerizable functional group. Since a polymerizable ultraviolet light absorber has a polymerizable functional group, it can be regarded as a kind of said polyfunctional compound (a) or monofunctional compound. However, in the present invention, a polymerizable ultraviolet light absorber is regarded as a kind of ultraviolet light absorber, and is not regarded as a kind of said polyfunctional compound (a) or monofunctional compound.

It is possible to use an inorganic compound having an ultraviolet light absorbing performance as an ultraviolet light absorber. For example, it is possible to use an inorganic oxide having an ultraviolet light absorbing performance such as zinc oxide, cerium oxide, titanium oxide and the like. These inorganic compounds should preferably be fine particles so as not to impair a transparency of a cured material layer. Their average particle sizes should be preferably almost the same as that of said colloidal silica.

Examples of an organic ultraviolet light absorber include a benzophenone type ultraviolet light absorber, a benzotriazole type ultraviolet light absorber, a salicylic acid type ultraviolet light absorber, a phenyltriazine type ultraviolet light absorber and the like. Particularly, a benzophenone type ultraviolet light absorber, a benzotriazole type ultraviolet light absorber and a phenyltriazine type ultraviolet light absorber are preferable. Also, preferable examples of a polymerizable ultraviolet light absorber include a benzophenone type ultraviolet light absorber having a (meth)acryloyl group and a benzotriazole type ultraviolet light absorber having a (meth)acryloyl group.

Particular examples of an ultraviolet light absorber other than a polymerizable ultraviolet light absorber include 2,4-dihydroxybenzophenone, 2-hydroxy-4-methoxybenzophenone, 2,2'-dihydroxy-4-methoxybenzophenone, 2-(2-hydroxy-5-methylphenyl) benzotriazole, 2-(5-t-butyl-2-hydroxyphenyl)benzotriazole, 2-(3,5-di-t-butyl-2-hydroxyphenyl)benzotriazole, 2-(3-t-butyl-2-hydroxy-5-methylphenyl)-5-chlorobenzotriazole, 2-(3,5-di-t-butyl-2-hydroxyphenyl)-5-chlorobenzotriazole, 2-(3,5-di-t-pentyl-2-hydroxyphenyl)benzotriazole, octyl 3-{3-(2H-benzotriazole-2-yl)-5-t-butyl-4-hydroxyphenyl}propionate, 2-[4-(2-hydroxy-3-dodecyloxypropyloxy)-2-hydroxyphenyl]-4,6-bis(2,4-dimethylphenyl)-1,3,5-triazine, phenylsalicylate, p-t-butylphenylsalicylate, and the like.

Examples of a benzophenone type ultraviolet light absorber having a (meth)acryloyl group include 2-hydroxy-4-(meth)acryloyloxybenzophenone, 2-hydroxy-4-(2-(meth)acryloyloxyethoxy)benzophenone, 2-hydroxy-4-(2-acryloyloxypropoxy)benzophenone, 2,2'-dihydroxy-4-(meth)acryloyloxybenzophenone, 2,2'-dihydroxy-4-(2-(meth)acryloyloxyethoxy)benzophenone, and the like.

Examples of a benzotriazole type ultraviolet light absorber having a (meth)acryloyl group include 2-{2-hydroxy-5-((meth)acryloyloxy)phenyl}benzotriazole, 2-{2-hydroxy-3-methyl-5-((meth)acryloyloxy) phenyl}benzotriazole, 2-{2-hydroxy-3-t-butyl-5-((meth)acryloyloxy)phenyl}benzotriazole, 2-{2-hydroxy-5-(2-(meth)acryloyloxyethyl)phenyl}benzotriazole, 2-{2-hydroxy-5-(3 -(meth)acryloyloxypropyl) phenyl}benzotriazole, 2-{2-hydroxy-3-t-butyl-5-(2-(meth) acryloyloxyethyl)phenyl)benzotriazole, 2-{2-hydroxy-3-t-butyl-5-(3-(meth)acryloyloxypropyl)phenyl}benzotriazole, 2-(2-hydroxy-3-methyl-5-(2-(meth)acryloyloxyethyl) phenyl}benzotriazole, 2-{2-hydroxy-3-methyl-5-(3-(meth) acryloyloxypropyl)phenyl}benzotriazole, 2-{2-hydroxy-5-(2-(meth)acryloyloxyethyl)phenyl}-5-chlorobenzotriazole, 2-{2-hydroxy-5-(2-(meth)acryloyloxyethyl)phenyl}-5-methylbenzotriazole, 2-{2-hydroxy-5-(2-(2-(meth) acryloyloxyethoxycarbonyl)ethyl)phenyl}benzotriazole, 2-{2-hydroxy-5-(2-(meth)acryloyloxyethoxy) phenyl}benzotriazole, 2-{2-hydroxy-5-(2-(meth) acryloyloxypropoxy)phenyl}benzotriazole, and the like.

It is preferable that a coating agent (A) further contains a light stabilizer. A preferable example of a light stabilizer include a hindered amine type light stabilizer (such as 2,2,6,6-tetraalkylpiperidine derivatives) which is usually used as a light stabilizer for a synthetic resin.

When a coating agent (A) contains a light stabilizer, its amount is preferably from 0.01 to 20 parts by weight, more preferably from 0.1 to 10 parts by weight, to 100 parts by weight of a curable component (total amount of a polyfunctional compound (a) and a monofunctional compound) in the coating agent (A). Further, a part or the whole part of a light stabilizer may be a polymerizable light stabilizer. A preferable example of a polymerizable light stabilizer includes 2,2,6,6-tetraalkylpiperidine derivatives having a (meth) acryloyl group.

Examples of a light stabilizer include 2,2,6,6-tetramethyl-4-piperidinylbenzoate, bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, tetra(2,2,6,6-tetramethyl-4-piperidinyl)butanetetracarboxylate, bis(1,2,2,6,6-pentamethyl-4-piperidinyl)-2-butyl-2-(3,5-di-t-butyl-4-hydroxybenzyl)malonate, 4-acryloyloxy-2,2,6,6-tetramethylpiperidine, 4-methacryloyloxy-2,2,6,6-tetramethylpiperidine, 4-methacryloyloxy-1,2,2,6,6-pentamethylpiperidine, 2,2,6,6-tetramethyl-4-(2-acryloyloxyethyl)piperidine, and the like.

Ultraviolet light is particularly preferable as an active energy ray for curing such a coating agent (A). However, it is not limited to ultraviolet light, and other active energy rays such as electron beam are usable. Examples of an ultraviolet light source include a xenon lamp, a pulse xenon lamp, a low pressure mercury lamp, a high pressure mercury lamp, an ultra-high pressure mercury lamp, a metal halide lamp, a carbon arc lamp, a tungsten lamp, and the like.

It is preferable that a thickness of a cured material layer formed by using a coating agent (A) is from 1 to 50 μm. If the thickness of this layer exceeds 50 μm, curing by an active energy ray becomes insufficient, and adhesiveness with a substrate material becomes poor. On the other hand, if the thickness of this layer is less than 1 μm, an abrasion resistance of this layer becomes insufficient, and an abrasion resistance and a scuff resistance of an outermost layer on this layer become unsatisfactory. A more preferable thickness of this layer is from 2 to 30 μm.

A curable coating agent (B) for forming an outermost layer comprises polysilazane alone or a curable composition containing polysilazane. A coating solution for coating a coating agent (B) usually contains a solvent. A layer of the coating agent (B) is formed by coating this coating solution and then removing the solvent. The coating agent (B) may contain a catalyst and other additives in addition to polysilazane.

Polysilazane is a polymer having at least 2 (—Si—N—) units, and in this chemical formula, two remaining free bonds of a silicon atom (tetravalent) and one remaining free bond of a nitrogen atom (trivalent) are respectively bonded to a hydrogen atom, an organic group (such as an alkyl group) or the like. Polysilazane may be not only a linear structure polymer comprising the above repeating units but also a cyclic structure polymer wherein one or both of the two remaining free bonds of the above silicon atom are bonded to the remaining free bond of the above nitrogen. A polymer may comprise a repeated cyclic structure only or may be a linear polymer partly having a cyclic structure.

Examples of polysilazane include polysilazane disclosed in JP-A-9-31333 or other documents cited therein, and these polysilazane may be used in the present invention. Further, modified polysilazane disclosed in JP-A-9-31333 or the documents cited therein can also be used in the present invention.

Polysilazane is decomposed in the presence of oxygen, and forms silica by substituting a nitrogen atom with an oxygen atom. The silica formed from polysilazane is a dense silica in comparison with silica formed from a hydrolyzable silane compound. For example, silica formed from perhydropolysilazane is dense and excellent in surface properties such as abrasion resistance as compared with silica formed from a tetrafunctional hydrolyzable silane compound (such as tetraalkoxysilane).

Examples of polysilazane include polysilazane containing substantially no organic group (perhydropolysilazane), polysilazane having a hydrolyzable group (such as an alkoxy group) bonded to a silicon atom, polysilazane having an organic group (such as an alkyl group) bonded to a silicon atom and/or a nitrogen atom, and the like. When polysilazane has a hydrolyzable group bonded to a silicon atom, silica containing substantially no organic group is formed by hydrolysis reaction during curing. Particularly, perhydropolysilazane is preferable in respect that its calcination temperature is low and a cured coating layer obtained after calcination is dense.

A cured material obtained by fully curing perhydropolysilazane is silica containing substantially no nitrogen atom. Also, in the case of polysilazane having an organic group (such as an alkyl group) bonded to a part or all of silicon atoms, silica containing an organic group formed therefrom is poor in respect of surface properties such as abrasion resistance but forms a tough and strong cured layer or can provide a thicker layer as compared with silica formed from perhydropolysilazane, and therefore depending on an object, it is rather preferable than perhydropolysilazane in some cases.

When polysilazane has an organic group bonded to a silicon atom, an organic group is preferably a hydrocarbon group or a halogenated hydrocarbon group, particularly a hydrocarbon group such as an alkyl group. A carbon number of these organic groups is not specially limited, but is preferably at most 20, more preferably at most 4. Further, a polysilazane having a long chain polyfluoroalkyl group as an organic group is preferable. A cured material of the polysilazane having a long chain polyfluoroalkyl group has a surface having water repellency, non-adhesiveness or the like due to the presence of a long chain polyfluoroalkyl group on its surface. The long chain polyfluoroalkyl group is preferably a $C_2$–$C_4$ polymethylene group having a $C_4$–$C_{16}$ long chain perfluoroalkyl group.

Polysilazane is a polymer having a chain-like structure, a cyclic structure or a crosslinking structure, or a polymer having a mixture of these plural structures in a molecule. A molecular weight of polysilazane is preferably a number average molecular weight of from 200 to 50,000. If the number average molecular weight is less than 200, a uniform cured layer is hardly obtained even by calcinating. On the other hand, if the number average molecular weight exceeds 50,000, it is hardly soluble in a solvent, and a coating agent (B) becomes unpreferably viscous.

Examples of a solvent for dissolving polysilazane used in a coating solution include hydrocarbon solvents such as an aliphatic hydrocarbon, a cycloaliphatic hydrocarbon or an aromatic hydrocarbon, halogenated hydrocarbon solvents, ethers such as an aliphatic ether or a cycloaliphatic ether, and the like.

Particular examples of the solvent include hydrocarbons such as pentane, hexane, isohexane, methylpentane, heptane, isoheptane, octane, isooctane, cyclopentane, methylcyclopentane, cyclohexane, methylcyclohexane, benzene, toluene, xylene and ethylbenzene, halogenated hydrocarbons such as methylene chloride, chloroform, carbon tetrachloride, bromoform, 1,2-dichloroethane, 1,1-dichloroethane, trichloroethane and tetrachloroethane, ethers such as ethylether, isopropylether, ethylbutylether, butylether, dioxane, dimethyldioxane, tetrahydrofuran and tetrahydropyran, and the like.

When using these solvents, plural kinds of solvents may be mixed in order to adjust solubility of polysilazane or evaporation speed of a solvent. An amount of a solvent varies depending on a coating method and a structure or an average molecular weight of polysilazane, but is preferably adjusted so as to provide a solid content concentration of from 0.5 to 80 wt % in a coating solution.

In order to form silica by curing polysilazane, heating process (generally called as "calcination") is necessary. However, in the present invention, since a substrate material is synthetic resin, its calcination temperature is limited. Thus, it is difficult to cure the polysilazane by heating at a temperature higher than a heat resistance temperature of a substrate. Generally, a heat resistance of a cured material of a coating agent (A) is higher than that of a substrate. However, there is a case that a heat resistance of a cured material is lower than a heat resistance of a substrate, and in such a case, it is necessary to cure polysilazane at a temperature lower than a heat resistance temperature of a cured material. Thus, in the present invention, a calcination temperature of polysilazane is preferably at most 180° C. when an ordinary synthetic resin such as an aromatic polycarbonate resin is used as a substrate.

In order to lower a calcination temperature of polysilazane, it is general to use a catalyst. Depending on a kind or an amount of a catalyst used, calcination can be carried out at a low temperature, and curing can be made at room temperature in some cases. Further, an atmosphere for calcination is preferably an atmosphere containing oxygen such as air. By calcining polysilazane, silica having a nitrogen atom substituted with an oxygen atom is formed. By calcining under an atmosphere fully containing oxygen, a dense silica is formed. Further, it is useful for a low temperature curing to treat with water or water vapor (see JP-A-7-223867).

As a catalyst, it is preferable to use a catalyst effective for curing polysilazane at a lower temperature. Examples of such a catalyst include metal catalysts comprising metal fine particles such as gold, silver, palladium, platinum or nickel (see JP-A-7-196986), amines or acids (see JP-A-9-31333), and the like. Examples of the amines include a monoalkylamine, a dialkylamine, a trialkylamine, a monoarylamine, a diarylamine, a cyclic amine and the like. Examples of the acids include an organic acid such as acetic acid, an inorganic acid such as hydrochloric acid, and the like.

A particle size of metal catalyst fine particles is preferably at most 0.1 μm, more preferably at most 0.05 μm in order to secure a transparency of a cured material. In proportion to reduction in a particle size, a specific surface area is increased and a catalyst performance is accordingly increased. Thus, it is preferable to use a catalyst having a smaller particle size also in respect of a catalyst performance. Amines or acids may be blended with a polysilazane solution, or a solution of amines or acids (including aqueous solution) or their vapors (including vapor from aqueous solution) may be brought into contact with polysilazane to accelerate curing.

When a catalyst is blended with polysilazane, an amount of a catalyst blended is from 0.01 to 10 parts by weight, preferably from 0.05 to 5 parts by weight, to 100 parts by weight of polysilazane. If the amount of a catalyst blended is less than 0.01 part by weight, a satisfactory catalyst effect can not be achieved, and on the other hand, if the amount of a catalyst blended exceeds 10 parts by weight, catalysts themselves are liable to agglomerate, thereby impairing transparency.

Also, if necessary, various additives can be blended with a coating agent (B). Examples of the additives include stabilizers such as an ultraviolet light absorber, a light stabilizer or an antioxidant, surfactants such as a leveling agent, a defoaming agent, a thickening agent, an anti-settling agent, a dispersant, an antistatic agent or an anti-fogging agent, an infrared ray absorber, a dye, a pigment, a filler, and the like. It is unpreferable to add an excess amount of these additives since an excess amount of additives lower a hardness of a cured material of a coating agent (B). When an additive is a relatively hard inorganic fine particle, its amount added is at most 1,000 parts by weight, preferably at most 200 parts by weight, to 100 parts by weight of polysilazane. When an additive is an organic compound, its amount added is at most 50 parts by weight, preferably at most 30 parts by weight, to 100 parts by weight of polysilazane. However, in the case of a polymerizable compound, it can be blended in a larger amount. Further, in the case of inorganic fine particles, their average particle size is at most 100 nm, preferably at most 50 nm.

One of preferable additives which can be blended with a coating agent (B) is the above mentioned polymerization initiators. A photopolymerization initiator generates a radical by being irradiated with an ultraviolet light. The radical thus generated has a function to accelerate curing of polysilazane. Thus, in order to accelerate curing of polysilazane, a photopolymerization initiator is blended with a coating agent (B) and the mixture is irradiated with an ultraviolet light. Further, when irradiating with an ultraviolet light for curing a coating agent (A), a coating agent (B) is also irradiated with an ultraviolet light when the coating agent (B) is present as mentioned below. Thus, in such a case, a photopolymerization initiator is incorporated in a coating agent (B) to accelerate curing of a coating agent (B). When incorporating a photopolymerization initiator, an amount of the photopolymerization initiator incorporated in a coating agent (B) is from 0.01 to 20 parts by weight, preferably from 0.1 to 10 parts by weight, to 100 parts by weight of polysilazane.

It is also preferable to incorporate an ultraviolet light absorber into a coating agent (B). Examples of the ultraviolet light absorber include the above mentioned ultraviolet light absorbers. Particularly, an ultraviolet light absorber comprising an inorganic compound such as zinc oxide or a polymerizable ultraviolet light absorber is preferable. When incorporating an ultraviolet light absorber, an ultraviolet light absorber comprising an inorganic compound can be incorporated in a relatively large amount, for example from 0.1 to 500 parts by weight, preferably from 1 to 200 parts by weight, to 100 parts by weight of polysilazane. When incorporating an ultraviolet light absorber comprising an organic compound, its amount incorporated is preferably from 0.01 to 20 parts by weight to 100 parts by weight of polysilazane.

Since a cured material layer of a coating agent (B) is an outermost layer, it is sometimes required to be electroconductive for antistatic property. In such a case, it is preferable to incorporate an antistatic agent or an electroconductive filler. Examples of an electroconductive filler include metal fine particles or electroconductive metal oxide fine particles. Examples of the metal include silver, gold, platinum, tin, indium and the like, and examples of the electroconductive metal oxide include tin oxide, indium oxide, a mixed metal oxide of indium and tin such as ITO, and the like.

Since a cured material of polysilazane, particularly perhydropolysilazane, is very hard, a cured material layer tends to cause cracking. Therefore, depending on a use of a transparent coated molded product of the present invention, it is required to prevent occurrence of cracking. In such a case, it is preferable to use a polysilazane having an organic group as mentioned above. However, it is not necessarily limited to this method, but an additive may be incorporated into a coating agent (B) to prevent occurrence of cracking of a cured material of polysilazane. Examples of such an additive include a filler, a synthetic resin, the above mentioned polyfunctional or monofunctional compounds, and the like. Examples of the filler include fine particles of the above mentioned colloidal silica. Examples of the synthetic resin include preferably a linear polymer soluble in a solvent used for a coating solution of a coating agent (B). Examples of such a polymer include a homopolymer or a copolymer of (meth)acrylate such as polymethylmethacrylate.

A thickness of a cured material layer formed by using a coating agent (B) is preferably from 0.05 to 10 $\mu$m. If a layer thickness of this outermost layer exceeds 10 $\mu$m, surface properties such as scuff resistance are not improved any further, and the layer becomes brittle and tends to cause cracks even by a small deformation of a coated molded product. On the other hand, if the layer thickness of the outermost layer is less than 0.05 $\mu$m, a satisfactory abrasion resistance or scuff resistance can not be achieved. Thus, a preferable layer thickness is from 0.1 to 3 $\mu$m.

The present invention further relates to a method for producing a transparent coated molded product as mentioned above. The above mentioned transparent coated molded product is produced preferably by the following methods. For example, an aimed transparent coated molded product is obtained by coating a coating solution of a coating agent (A) on a substrate, drying to cure a layer of the coating agent (A), further coating a coating solution of a coating agent (B) on the surface of the cured material thus obtained, and drying to cure a layer of the coating agent (B). hereinafter, the above method of producing a transparent coated molded product in accordance with the present invention is explained in more detail.

A means of coating a coating composition is not specially limited, but a well known method can be employed. Examples of the coating method includes a dipping method, a flow coat method, a spray method, a bar coat method, a gravure coat method, a roll coat method, a blade coat method, an air knife coat method, a spin coat method, a slit coat method, a microgravure coat method, and the like. When a coating composition contains a solvent after coating, it is dried to remove the solvent, and a layer of a coating agent (A) is cured by being irradiated with an ultraviolet light or the like, and a layer of a coating agent (B) is cured by heating or by being allowed to stand at room temperature. It is possible to accelerate curing by making contact with an aqueous solution or vapor of amines or acids.

Examples of combinations (timing) of curing of a coating agent (A) and from coating to curing of a coating gent (B) include the following four methods.

1) A method (the above mentioned method) comprising forming a layer of a coating agent (A), irradiating with a sufficient amount of an active energy ray to fully cure, and forming a layer of a coating agent (B) thereon.

2) A method comprising forming a layer of an uncured material of a coating agent (A), forming a layer of an uncured material of a coating agent (B) on the uncured material layer, and irradiating with a sufficient amount of an active energy ray to complete curing of the uncured material of a coating agent (A). In this case, the uncured material of a coating agent (B) is cured at the same time as curing of the uncured material of a coating agent (A) or cured by heating- or the like after curing the uncured material of a coating agent (A).

3) A method comprising coating a layer of a coating agent (A), irradiating with an active energy ray (usually a irradiation amount of about at most 300 mJ/cm$^2$) so as to dry to touch or to incompletely cure for forming a layer of a partially cured material of a coating agent (A), forming a layer of an uncured material of a coating agent (B) on the partially cured material layer, and then irradiating with a sufficient amount of an active energy ray to finally cure the uncured material of a coating agent (A). Curing of the uncured material of a coating agent (B) can be conducted in the same manner as in the above method 2).

4) A method comprising forming a layer of an uncured material or a partially cured material of a coating agent (A) and a layer of an uncured material of a coating agent (B) in the same manner as in the above method 2) or 3), partially curing or completely curing the uncured material of a coating agent (B) and then completely curing the uncured material or partially cured material of a coating agent (A). In this case, it is preferable that a coating agent (A) is maintained rather in partially cured state than in uncured state at the time of curing the uncured material of a coating agent (B). Further, it is preferable that a coating agent (B) is maintained in partially cured state at the time of completely curing a coating agent (A).

The above method 2) or 3) is preferable for raising an adhesive force between layers of two cured material layers. Further, in the methods 2) to 4), a layer of an uncured, partially cured or completely cured material of a coating agent (B) works as a barrier layer to penetration of oxygen liable to unfavorably affect on complete curing of a coating agent (A), thereby removing a fear of causing an unsatisfactory curing of a coating agent (A).

Since a transparent coated molded product of the present invention has satisfactory surface properties such as abrasion resistance and scuff resistance at the same level as in glass, the product of the present invention can be employed for various uses in the same manner as in conventional glass. Examples of these uses include a window material for a vehicle. However, for this purpose, a bending-processed molded product is necessary in many cases. When producing a bending-processed transparent coated molded product of the present invention, a transparent coated molded product of the present invention can be prepared by using a bending-processed substrate. However, when using a bending-processed substrate, it is sometimes difficult to form each layer by coating and curing. On the other hand, the present inventors have previously studied and noted that a substrate having a cured material layer of a coating agent (A) formed can be subjected to bending process by heat-bending process or the like. However, when a cured material layer of a coating agent (B) is formed, bending process is difficult since its cured material is hard.

The present inventors have found that if a layer of a coating agent (B) is maintained in uncured or partially cured state, a substrate having such a layer (also having a cured material layer of a coating agent (A)) can be subjected to bending process. Also, as in the above methods 2) to 4), a substrate having a layer of a coating agent (A) in uncured or partially cured state and a layer of a coating agent (B) in uncured or partially cured state formed thereon can be subjected to bending process. By curing the uncured or partially cured material of a coating agent (B) after bending-processing or at the same time as bending-processing, an aimed bending-processed coated molded product can be obtained. Bending-processing is usually carried out by heating. Therefore, the uncured or partially cured material of a coating agent (B) is cured by heat for bending-processing, but since a time required for curing the uncured or partially cured material of a coating agent (B) is usually longer than a time required for bending-processing, there is no fear that bending-processing becomes difficult by curing of a coating agent (B). Also, curing of a coating agent (B) after bending-processing can be advantageously carried out by the method 4).

Thus, a bending-processed-coated molded product of the present invention can be produced by forming an uncured, partially cured or cured material layer of a coating agent (A) on a substrate, forming an uncured or partially cured material layer of a coating agent (B) on the surface of the layer of a coating agent (A), bending-processing the substrate having these layers, and then curing the uncured or partially cured material of a coating agent (B) and the uncured or partially cured material of a coating agent (A), if any.

More particularly, an uncured or partially cured material layer of a coating agent (B) is formed on a substrate, and the substrate is heated at its heat-softening temperature for about 5 minutes and is then subjected to bending-processing. Thereafter, the substrate is maintained at a curable temperature lower than the heat-softening temperature of the substrate to cure the uncured or partially cured material of a coating agent (B), thereby producing a bending-processed coated molded product of the present invention. Curing of a coating agent (A) may be carried out before or after completely curing a coating agent (B). According to this method, since a substrate is deformed before completely curing a coating agent (B) and a hard silica layer is formed thereafter, the silica layer does not cause cracks.

In the present invention, various transparent synthetic resins can be used as a substrate material. Examples of the substrate material include transparent synthetic resins such as an aromatic polycarbonate type resin, a polymethyl-methacrylate type resin (acrylic resin), a polystyrene type resin, a polyallylate type resin and the like. Particularly, a substrate comprising an aromatic polycarbonate type resin is preferable.

This substrate is a molded product, examples of which include a sheet-like substrate such as a flat sheet or a corrugated sheet, a film-like substrate, a substrate formed into various forms, a laminate having at least surface layer of various transparent synthetic resins, and the like. Particularly, a flat sheet-like substrate (not bending-processed) is preferable. In the present invention, a flat sheet comprising an aromatic polycarbonate type resin is particularly preferable as a substrate. This sheet has a thickness of from 1 to 100 mm to be suitably used for a window material and the like. On one side or both sides of this sheet, the above mentioned at least 2 transparent cured material layers are formed.

A bending-processed transparent coated molded product of the present invention has excellent properties particularly suitable as a window material for vehicles. As compared with a glass window material for vehicles, a transparent coated molded product of the present invention is light and has satisfactory surface properties comparable to glass. Hereinafter, a transparent coated molded product of the present invention suitable as a window material for vehicles is explained in more detail.

Various outer forces such as a scuffing force are applied from outside to a window material for vehicles. Therefore, a transparent coated molded product of the present invention is mounted on a vehicle body preferably so as to make the first coating layer faced outside. In this case, the outermost layer of a transparent coated molded product of the present invention should preferably have an abrasion resistance of at most 10% by an abrasion resistance test (rotation number of sample: 1,000 times) in accordance with JIS R 3212. Particularly, when a transparent coated molded product of the present invention is mounted on a front side window of a vehicle, an abrasion resistance should preferably be at most 4% in order to secure a driver's sight.

Since outer forces such as abrasion or scuffing are applied also to the inner side of a window material for a vehicle, it is preferable for a transparent coated molded product of the present invention to have an abrasion-resistant surface layer also on the inner side of a window for a vehicle. For example, a transparent coated molded product of the present invention can have the above mentioned inner layer and outermost layer provided also on the inner side of a window for a vehicle. Also, it is possible to make the above mentioned inner layer for a surface layer by having the inner layer provided with a satisfactory abrasion resistance of some level. Also, it is possible to make an abrasion-resistant layer other than these layers for a surface layer. Further, depending on an aimed object, it is possible to provide a surface layer having surface properties other than an abrasion resistance on the inner side of a window for a vehicle.

Examples of a case in which a surface layer other than the above mentioned outermost layer on the inner side of a vehicle, includes the following cases. Generally, examples of windows for a vehicle include fixed windows such as a windshield, a side window or a rear window and sliding windows such as a sliding door window. A fixed window is adhered and fixed on a vehicle body by means of an adhesive such as an urethane type adhesive, and it is therefore necessary to select a surface layer on the inner side of a vehicle, which can be fully adhered and fixed on the vehicle body. The above mentioned outermost layer satisfactorily achieves an adhesive and fixing force on the vehicle body. However, when it is required to be more highly adherent, it is preferable to provide a resin layer having a high adherent property as a surface layer. Examples of a resin having a high adherent property include an acrylic resin such as a (meth)acrylate homopolymer or copolymer. The above mentioned inner layer comprising a cured material of a polyfunctional compound (a) having a (meth)acryloyloxy group is preferable as a resin layer having a high adherent property. Also, since the above mentioned inner layer has a certain level of high abrasion resistance, a transparent coated molded product of the present invention having this layer on the inner side of a vehicle can be used as a sliding window.

When preparing a molded produce having the above mentioned second surface layer on one side of a coated molded product of the present invention, it is preferable to carry out bending-process during forming the second surface layer or after forming the second surface layer. The above mentioned inner layer can be subjected to bending-process after curing the coating agent (A). Therefore, it is possible to produce an aimed transparent coated molded product of the present invention by using a substrate having the above mentioned inner layer on one side, forming the above mentioned inner layer and outer layer on the other side and being subjected to bending treatment.

The above surface layer is not limited to the above mentioned inner layer. The above mentioned inner layer is a cured material cured by an energy ray such as ultraviolet light. However, the above surface layer may be a cured material layer cured by heat. For example, the above surface layer may be formed by using a heat polymerization initiator such as peroxide in place of a photopolymerization initiator in a coating agent (A) and using a heat-curable coating agent having the same composition as in the coating agent (A). Also, the above surface layer can be prepared by using a transparent thermoplastic resin having an abrasion resistance higher than a substrate as a surface layer material and laminating this layer on the substrate.

Heretofore, it has been known to use a laminated glass comprising at least 2 glass sheets having an intermediate film provided therebetween as a window material for a vehicle. A transparent coated molded product of the present invention can be used as one of glass sheets for this laminated glass. In this case, it is not necessary to provide a surface layer having an abrasion resistance on one side of the transparent coated molded product of the present invention, which is faced to the other glass sheets and is not exposed outside. Further, in order to improve an adhesiveness with an intermediate layer, it is possible to provide a layer having a suitable surface property other than abrasion resistance. Further, it is possible to use a transparent coated molded product as a laminated resin plate comprising at least 2 resin plates having an intermediate layer or intermediate adhesive layer provided therebetween. In such a case, it is preferable to fix so as to have the above mentioned outermost layer of the laminated resin plate faced outside of a vehicle.

A transparent coated molded product of the present invention may be provided with a dark colored layer formed on the periphery part of a window material to conceal an adhesive used for adhering and fixing to a vehicle body from outside view of a vehicle, and also may be provided with a linear antenna conductor, a heat ray conductor or the like equipped on predetermined parts of a window material. For example, they can be provided by coating a dark paint or applying a ceramic conductor print between an inner layer and a substrate, between a substrate and an outermost layer or a surface layer, and on an outermost layer or a surface layer. Also, it is possible to use a window material itself as a colored transparent window by adding a coloring agent to a cured material of each layer constituting a window material. It is also possible to produce a transparent coated molded product of the present invention provided with a colored conductor print by using a layer between an inner layer and a substrate.

EXAMPLES

Hereinafter, the present invention is further explained with reference to Preparation Examples (Examples 1 to 5), working Examples (Examples 6 to 20 and Examples 27 to 45) and Comparative Examples (Examples 21 to 26), but the present invention should not be limited to these Examples. Various physical properties disclosed in these Examples were measured and evaluated in accordance with the following methods. The results of Examples 6 to 26 are disclosed in the following Table 1, and the results of Examples 27 to 33 are disclosed in the following Table 2. The following Table 1 shows measurement and evaluation results of physical properties with regard to ordinary architectural glass sheets.

(Initial Haze Value and Abrasion Resistance)

In accordance with an abrasion resistance test of JIS-R3212, a haze value was measured by a hazemeter after making 500 times rotations and 1000 times rotations of two CS-10F abrading rings respectively provided with a weight of 500 g. The haze value was measured at four points on an abrading cycle track, and their average value was calculated.

An initial haze value is a haze value (%) before the abrasion test, and an abrasion resistance is calculated as illustrated below.

Abrasion resistance (%)=(haze value after abrasion test)−(haze value before abrasion test)

Also, an abrasion resistance test of an inner layer before forming an outermost layer was carried out with regard to a sample prepared by coating a curable coating agent (A) on a substrate and fully curing the coating agent, and an abrasion resistance was evaluated by measuring a haze value before the abrasion resistance test and a haze value after making 100 times rotations of the abrading rings in the same manner as mentioned above.

(Adhesiveness)

11 lines of cut breaks were made respectively in the length direction and in the breadth direction at a distance of 1 mm on a sample by a shaving razor to prepare 100 crosscuts, and a commercially available adhesive cellophane tape was fully adhered thereto, and was rapidly stripped from the sample toward this side at an angle of 90°, and a number of crosscuts (m) remained without peeling off was expressed by "m/100".

(Weather Resistance)

A weather resistance test was made by a sunshine weatherometer by evaluating an outer appearance of a test sample after exposing the test sample to a cycle of raining for 12 minutes and drying for 48 minutes at a black panel temperature of 63° C. for 3000 hours.

(Ultraviolet Light-absorbing Performance)

A transparent cured material layer was formed on a parting glass, and the transparent cured material film was peeled from the parting glass, and an absorption spectrum of the film was measured by a spectrophotometer to measure a transmittance of an ultraviolet light of 350 nm.

Also, starting materials and production conditions used in these Examples are those illustrated below unless otherwise specified.

Resin plate: Transparent aromatic polycarbonate resin plate having a thickness of 3 mm (150 mm×300 mm)

Drying condition of a coating solution of coating agent (A): Maintained at 80° C. for 5 minutes in a hot air-circulating oven Drying condition of a coating solution of coating agent (B): Maintained at 80 ° C. for 10 minutes in a hot air-circulating oven Coating method of coating solutions of coating agents (A) and (B): Coating by a bar-coater Irradiation condition of ultraviolet light: Irradiation with a high pressure mercury lamp in air atmosphere

Example 1

5 parts by weight of 3-mercaptopropyl trimethoxysilane and 3.0 parts by weight of 0.1N hydrochloric acid were added to 100 parts by weight of ethylcellosolve-dispersion type colloidal silica (silica content: 30 wt %, average particle size: 11 nm), and the resultant mixture was stirred at 100° C. for 6 hours, and was then aged at room temperature for 12 hours to obtain a mercaptosilane-modified silica dispersion.

Example 2

An acrylsilane-modified colloidal silica dispersion was obtained in the same manner as in Example 1, except that 5 parts by weight of 3-acryloyloxypropyl trimethoxysilane was used in place of 3-mercaptopropyl trimethoxysilane.

Example 3

An aminosilane-modified colloidal silica dispersion was obtained in the same manner as in Example 1, except that 5 parts by weight of N-phenyl-3-aminopropyl trimethoxysilane was used in place of 3-mercaptopropyl trimethoxysilane.

Example 4

An epoxysilane-modified colloidal silica dispersion was obtained in the same manner as in Example 1, except that 5 parts by weight of 3-glycidoxypropyl trimethoxysilane was used in place of 3-mercaptopropyl trimethoxysilane.

Example 5

A mercaptosilane-modified colloidal silica dispersion was obtained in the same manner as in Example 1, except that 100 parts by weight of 2-propanol-dispersion type colloidal silica (silica content: 30 wt %, average particle size: 11 nm) was used in place of the ethylcellosolve-dispersion type colloidal silica and the reaction temperature was made $_{83}$° C.

Example 6

15 g of 2-propanol, 15 g of butyl acetate, 7.5 g of ethyl cellosolve, 150 mg of 2,4,6-trimethylbenzoyl diphenylphosphine oxide, 1 g of 2-(3,5-di-t-pentyl-2-hydroxyphenyl) benzotriazol and 200 mg of bis(1-octyloxy-2,2,6,6-tetramethyl-4-piperidinyl)sebacate were added and dissolved in a 100 mL four-forked flask equipped with a stirrer and a cooling tube, and 10.0 g of urethane acrylate (containing averagely 15 acryloyl groups per molecule) which is a reaction product of hydroxyl group-containing dipentaerythritol polyacrylate and partially nurated hexamethylene diisocyanate, was added thereto, and the resultant mixture was stirred at normal temperature for 1 hour to obtain a coating composition (hereinafter referred to as "coating solution (A-1)").

The coating solution (A-1) thus obtained was coated on a resin plate (wet thickness: 22 μm), and was dried.

The coating was irradiated with ultraviolet light of 3000 mJ/cm$^2$ (integrated energy amount of ultraviolet light of wavelength of 300 to 390 nm, hereinafter the same) to form a transparent cured material layer having a layer thickness of 5 μm.

The transparent cured material layer thus formed was further coated with a xylene solution of perhydropolysilazane containing a low temperature-curable metal catalyst (solid content: 20 wt %, number average molecular weight of perhydropolysilazane: 1000, tradename "L110" manufactured by Tonen K.K.) (hereinafter referred to as "coating solution (B-1)") to provide a coating layer (having a wet thickness of 6 μm) as an outermost layer, which was then fully cured by maintaining in a hot air-circulating oven at 100° C. for 120 minutes. It was identified by IR analysis that the outermost layer became a complete silica layer (in the following Examples also, complete curing of coating agent (B) was identified by IR analysis). In this manner, a transparent cured material layer having a total layer thickness of 6.2 μm was formed on the resin plate. Various properties of the sample thus obtained were measured and evaluated.

On the other hand, coating solution (A-1) was coated on a resin plate and was dried and irradiated with ultraviolet light to fully cure and to form a transparent cured material layer having the same thickness as mentioned above. Abrasion resistance of the transparent cured material layer surface of the sample thus obtained was evaluated. The abrasion resistance after 100 rotations was 2–8%. Abrasion resistances of inner layers of the following Examples were measured in the same manner as mentioned above.

Example 7

A sample was prepared in the same manner as in example 6, except that the production process was modified in the following manner.

Coating solution (A-1) was coated and dried, and was irradiated with ultraviolet light of 150 mJ/cm$^2$ to form a partially cured material layer having a layer thickness of 5 $\mu$m. The partially cured material layer thus formed was further coated with coating solution (B-1) (to provide a wet thickness of 6 $\mu$m) and was dried and irradiated with ultraviolet light of 3000 mJ/cm$^2$. Finally, the sample thus obtained was maintained in a hot air-circulating oven at 100° C. for 120 minutes, and various properties were measured and evaluated

Example 8

A sample was prepared in the same manner as in Example 7, except that the production process was modified in the following manner.

Finally, the sample was aged at 23° C. in air atmosphere of a relative humidity of 55% for one day in place of maintaining in a hot air-circulating oven at 100° C. for 120 minutes, and various properties were measured.

Example 9

A sample was prepared in the same manner as in Example 7, except that the production process was modified in the following manner.

A coating layer (having a wet thickness of 6 $\mu$m) was formed by coating a xylene solution of perhydropolysilazane containing no catalyst (solid content: 20 wt %, number average molecular weight of perhydropolysilazane: 700, tradename "V110" manufactured by Tonen K.K.) in place of the coating solution (B-1) and was dried. Thereafter, perhydropolysilazane was cured by maintaining the coating layer on a 3 wt % triethylamine aqueous solution bath for 3 minutes.

Example 10

A sample was prepared in the same manner as in Example 6, except that the production process was modified in the following manner.

After coating and drying coating solution (A-1), coating solution (B-1) was coated thereon (so as to provide a wet thickness of 6 $\mu$m) and was dried. The sample was then irradiated with ultraviolet light of 3000 mJ/cm$^2$. Finally, the sample was maintained in a hot air-circulating oven at 100° C. for 120 minutes, and various properties were measured and evaluated.

Example 11

15 g of 2-propanol, 15 g of butyl acetate, 150 mg of 2,4,6-trimethylbenzoyl diphenylphosphine oxide, 1 g of 2-(3,5-di-t-pentyl-2-hydroxyphenyl)benzotriazol and 200 mg of bis(1-octyloxy-2,2,6,6-tetramethyl-4-piperidinyl) sebacate were added and dissolved in a 100 mL four-forked flask equipped with a stirrer and a cooling tube, and 10.0 g of tris(2-acryloyloxyethyl)isocyanurate was added thereto and the resultant mixture was stirred at normal temperature for 1 hour. Thereafter, 30.3 g of the mercaptosilane-modified colloidal silica dispersion prepared in Example 1 was further added thereto, and the resultant mixture was stirred at room temperature for 15 minutes to obtain a coating composition (hereinafter referred to as "coating solution (A-2)").

The coating solution (A-2) thus obtained was coated on a resin plate (to provide a wet thickness of 16 $\mu$m), and was dried and irradiated with ultraviolet light of 150 mJ/cm$^2$ to form a partially cured material layer having a layer thickness of 5 $\mu$m. The partially cured material layer thus formed was further coated with coating solution (B-1) (to provide a wet thickness of 6 $\mu$m), and was dried and irradiated with ultraviolet light of 3000 mJ/cm$^2$. Finally, the sample thus obtained was maintained in a hot air-circulating oven at 100° C. for 120 minutes, and various properties were measured and evaluated.

On the other hand, a sample was prepared by coating a coating solution (A-2) on a resin plate and fully curing to form a transparent cured material layer, and the transparent cured material layer surface was evaluated with regard to abrasion resistance. The abrasion resistance after 100 rotations was 0.9%.

Example 12

A sample was prepared in the same manner as in Example 11, except that the production process was modified in the following manner.

Finally, the sample was aged in air atmosphere having a relative humidity of 55% at 23° C. for one day in place of maintaining in a hot air-circulating oven at 100° C. for 120 minutes, and various properties were measured.

Example 13

A sample was prepared in the same manner as in Example 11, except that the acrylsilane-modified colloidal silica dispersion prepared in Example 2 was used in the same amount in place of the modified colloidal silica dispersion used in Example 11, and various properties of the sample thus obtained were measured and evaluated. Also, a transparent cured material layer prepared by coating a coating solution using this acrylsilane-modified colloidal silica dispersion and fully curing was measured with regard to an abrasion resistance, and the abrasion resistance after 100 rotations was 1.1%.

Example 14

A sample was prepared in the same manner as in Example 11, except that the aminosilane-modified colloidal silica dispersion prepared in Example 3 was used in the same amount in place of the modified colloidal silica dispersion used in Example 11, and various physical properties of the sample thus obtained were measured and evaluated. Also, a transparent cured material layer prepared by coating a coating solution using this aminosilane-modified colloidal silica dispersion and fully curing was measured with regard to an abrasion resistance, and the abrasion resistance after 100 rotations was 1.3%.

Example 15

A sample was prepared in the same manner as in Example 11, except that the epoxysilane-modified colloidal silica dispersion prepared in Example 4 was used in the same amount in place of the modified colloidal silica dispersion used in Example 11, and various physical properties of the sample thus obtained were measured and evaluated. Also, a transparent cured material layer prepared by coating a coating solution using this epoxysilane-modified colloidal silica dispersion and fully curing was measured with regard to an abrasion resistance, and the abrasion resistance after 100 rotations was 1.2%.

Example 16

A sample was prepared in the same manner as in Example 11, except that the mercaptosilane-modified colloidal silica dispersion in 2-propanol prepared in Example 5 was used in the same manner in place of the modified colloidal silica dispersion used in Example 11, and various physical properties of the sample thus obtained were measured and evaluated. Also, a transparent cured material layer prepared by coating a coating solution using this mercaptosilane-modified colloidal silica dispersion and fully curing was measured with regard to an abrasion resistance, and the abrasion resistance after 100 rotations was 1.4%.

Example 17

A sample was prepared in the same manner as in Example 11, except that the production process was modified in the following manner.

Coating solution (A-2) was coated on a resin plate (to provide a wet thickness of 16 $\mu$m) and dried, which was then irradiated with ultraviolet light of 150 mJ/cm$^2$ to form a partially cured material layer having a layer thickness of 5 $\mu$m. Coating solution (B-1) was coated thereon (to provide a wet thickness of 6 $\mu$m) and was dried, which was then irradiated with ultraviolet light of 3000 mJ/cm$^2$. The sample thus obtained was maintained in a hot air-circulating oven at 170° C. for 5 minutes, and immediately after taking out from the oven, the sample was bending-processed by pressing the sample onto a mold having a curvature of 64 mmR so as to make the transparent cured material layer side convex. Thereafter, the sample was aged at room temperature for one day, and was observed with regard to its outer appearance. As this result, a satisfactory cured material layer having no cracks or wrinkles was obtained.

On the other hand, the sample having two full cured material layers finally obtained in Example 11 was maintained in a hot air-circulating oven at 170° C. for 5 minutes, and immediately after taken out from the oven, the sample was bending-processed by pressing the sample onto a mold having a curvature of 64 mmR so as to make the transparent cured material layer side convex, and the sample was observed with regard to its outer appearance. As this result, the cured material layer had cracks and wrinkles occurred.

Example 18

A sample was prepared in the same manner as in Example 6, except that the production process was modified in the following manner.

Coating solution (B-1) was coated and dried, and the sample was maintained in a hot air-circulating oven at 100° C. for 10 minutes to partially cure perhydropolysilazane (absorption intensity of Si—H was identified to be about ¾ in comparison with uncured perhydropolysilazane by IR analysis). Thereafter, the sample was irradiated with ultraviolet light of 3000 mJ/cm$^2$, and was maintained in a hot air-circulating oven at 120° C. for 120 minutes to fully cure perhydropolysilazane. Various physical properties of the sample thus obtained were measured and evaluated.

Example 19

A sample was prepared in the same manner as in Example 18, except that the production process was modified in the following manner.

Finally, perhydropolysilazane was cured by aging at 23° C. for one day in air atmosphere having a relative humidity of 55% in place of curing by maintaining in a hot air-circulating oven at 120° C. for 120 minutes, and various physical properties of the sample thus obtained were measured.

Example 20

A sample was prepared in the same manner as in Example 11, except that the production process was modified in the following manner.

After coating and drying coating solution (B-1), the sample was maintained in a hot air-circulating oven at 100° C. for 10 minutes to partially cure perhydropolysilazane (absorption intensity of Si-H was identified to be about ¾ in comparison with uncured perhydropolysilazane by IR analysis). Thereafter, the sample was irradiated with ultraviolet light of 3000 mJ/cm$^2$, and was maintained in a hot air-circulating oven at 120° C. for 120 minutes to fully cure perhydropolysilazane. Various physical properties of the sample thus obtained were measured and evaluated.

Example 21

A coating solution having the same composition as in Example 6 was prepared, except that 10.0 g of urethane acrylate was replaced by 10.0 g of a reaction product of 1 mol of bisphenol A-ethylene oxide two molecules adduct, 2 mols of hexamethylenediisocyanate and 2 mols of 2-hydroxyethyl acrylate (two-functional urethane acrylate having a molecular weight of 1000, a melting point of 28° C. and 2 acryloyl groups per molecule) (hereinafter referred to as "coating solution X"), and coating solution X and coating solution (B-1) were used in the same manner under the same conditions as in Example 6 to prepare a sample having 2 cured material layers. Various physical properties of this sample were measured and evaluated.

Also, a resin plate sample having a transparent cured material layer of coating solution X formed was evaluated with regard to abrasion resistance of the transparent cured material layer surface. The abrasion resistance after 100 rotations was 15.8%.

Example 22

Coating solution (A-1) was coated on a resin plate (wet thickness: 20 $\mu$m) and dried. The resin plate thus coated was irradiated with ultraviolet light of 3000 mJ/cm$^2$ to cure a transparent cured material layer having a layer thickness of 6 $\mu$m, and various physical properties of this sample were measured and evaluated.

Example 23

Coating solution (B-1) was coated on a resin plate (wet thickness: 10 $\mu$m) and dried. The resin plate thus coated was maintained in a hot air-circulating oven at 100° C. for 120 minutes to form a transparent cured material layer having a layer thickness of 2 $\mu$m, and various physical properties of this sample were measured and evaluated.

Example 24

Coating solution (A-2) was coated on a resin plate by a bar-coater (wet thickness: 20 $\mu$m), and the resin plate thus coated was maintained in a hot air-circulating oven at 80° C. for 5 minutes. The resin plate thus coated was irradiated with ultraviolet light of 3000 mJ/cm$^2$ to cure a transparent cured material layer having a layer thickness of 6 $\mu$m, and various physical properties of this sample were measured and evaluated.

Example 25

Coating solution (B-1) in Example 6 was replaced by coating solution (hereinafter referred to as "coating solution Y") comprising 100 g of partially hydrolyzed condensate (molecular weight: 2000) of trimethoxymethylsilane, 30 g of colloidal silica (average particle size: 11 nm), 150 g of ethylcellosolve and 150 g of butyl acetate.

Coating solution (A-1) was coated on a resin plate (wet thickness: 30 μm) and dried, and the resin plate thus coated was irradiated with ultraviolet light of 150 mJ/cm$^2$ to form a transparent cured material layer having a layer thickness of 7 μm. Coating solution Y was then coated on the above formed cured material layer surface (wet thickness: 8 μm), and the resin plate thus coated was maintained in a hot air-circulating oven at 80° C. for 10 minutes and dried. The resin plate thus coated was irradiated with ultraviolet light of 3000 mJ/cm$^2$, and was further maintained at 120° C. for 2 hours to form 2 transparent cured material layers having a total thickness of 10 μm.

Example 26

A sample was prepared by using the same materials and the same conditions as in Example 25, except that coating solution (A-2) was used in place of coating solution (A-1).

TABLE 1

| | Initial haze value (%) | Abrasion resistance 500 times | Abrasion resistance 1000 times | Adhesiveness | Weather resistance |
|---|---|---|---|---|---|
| Example 6 | 0.5 | 2.0 | 3.0 | 100/100 | No change |
| Example 7 | 0.5 | 1.7 | 2.5 | 100/100 | No change |
| Example 8 | 0.5 | 1.2 | 1.8 | 100/100 | No change |
| Example 9 | 0.5 | 1.1 | 1.8 | 100/100 | No change |
| Example 10 | 0.6 | 1.0 | 1.7 | 100/100 | No change |
| Example 11 | 0.5 | 0.9 | 1.6 | 100/100 | No change |
| Example 12 | 0.5 | 0.7 | 1.2 | 100/100 | No change |
| Example 13 | 0.4 | 1.2 | 2.2 | 100/100 | No change |
| Example 14 | 0.4 | 1.6 | 2.4 | 100/100 | No change |
| Example 15 | 0.4 | 1.4 | 2.3 | 100/100 | No change |
| Example 16 | 0.4 | 1.0 | 1.8 | 100/100 | No change |
| Example 18 | 0.5 | 0.9 | 1.9 | 100/100 | No change |
| Example 19 | 0.5 | 0.6 | 1.4 | 100/100 | No change |
| Example 20 | 0.5 | 0.6 | 1.3 | 100/100 | No change |
| Example 21 | 0.5 | 28.8 | 52.2 | 90/100 | Separation of layer |
| Example 22 | 0.4 | 20.2 | 50.7 | 100/100 | No change |
| Example 23 | 0.4 | 54.6 | 76.3 | 20/100 | Separation of layer |
| Example 24 | 0.4 | 6.1 | 10.6 | 100/100 | Occurrence of little crack |
| Example 25 | 0.5 | 12.0 | — | 0/100 | Colored yellow and separation of layer |
| Example 26 | 0.5 | 9.2 | — | 0/100 | Colored yellow and separation of layer |
| Glass | 0.2 | 0.6 | 0.9 | — | No change |

Example 27

A coating solution having the same composition as coating solution (A-1) was prepared in the same manner as in the preparation of coating solution (A-1), except that 500 mg of 2-[2-hydroxy-5-(acryloyloxyethyl)phenyl]benzotriazol was used in place of 1 g of 2-(3,5-di-t-pentyl-2-hydroxyphenyl) benzotriazol. Hereinafter, this coating solution was referred to as "coating solution (A-3)". Coating solution (A-3) was coated on a resin plate (wet thickness: 22 μm) and dried. The coated layer was cured by irradiating with ultraviolet light of 3000 mJ/cm$^2$ to form a cured material layer having a layer thickness of 5 μm. Thereafter, coating solution (B-1) was further coated on the cured material layer (wet thickness: 6 μm) and dried, and was maintained in a hot air-circulating oven at 100° C. for 120 minutes to fully cure the outermost layer to form 2 transparent cured layers (total layer thickness: 6.2 μm) on the resin plate. Various physical properties of this sample were measured and evaluated.

On the other hand, another sample of a resin plate having a fully cured transparent cured material layer of coating solution (A-3) formed was evaluated with regard to an abrasion resistance. The abrasion resistance after 100 rotations was 2.3%.

Example 28

A coating solution having the same composition as coating solution (A-3) was prepared in the same manner as in Example 27, except that 500 mg of 2-[2-hydroxy-5-(acryloyloxyethyl)phenyl]benzotriazol was replaced by 1 g of the same compound (hereinafter referred to as "coating solution (A-4)").

Coating solution (A-4) was coated on a resin plate (wet thickness: 22 μm) and dried, and was cured by irradiating with ultraviolet light of 3000 mJ/cm$^2$ to form a transparent cured material layer having a layer thickness of 5 μm. Coating solution (B-1) was further coated on the transparent cured material layer in the same manner as in Example 27 (wet thickness: 6 μm) and was cured to form 2 transparent cured material layers (total layer thickness: 6.2 μm). This sample was measured and evaluated with regard to various physical properties.

On the other hand, another sample of a resin plate having a fully cured transparent cured material layer of coating solution (A-4) formed was evaluated with regard to an abrasion resistance. The abrasion resistance after 100 rotations was 2.5%.

Example 29

A coating solution having the same composition as coating solution (A-3) was prepared in the same manner as in Example 27, except that 500 mg of 2-[2-hydroxy-5-(acryloyloxyethyl)phenyl]benzotriazol was replaced by 1 g of 2-hydroxy-4-(2-acryloyloxy)ethoxybenzophenone (hereinafter referred to as "coating solution (A-5)").

Coating solution (A-5) was coated on a resin plate by a bar-coater (wet thickness: 22 μm) and dried, and was cured by irradiating with ultraviolet light of 3000 mJ/cm$^2$ to form a cured material layer having a layer thickness of 5 μm. Coating solution (B-1) was further coated on the cured material layer (wet thickness: 6 μm) and dried, and was further maintained in a hot air-circulating oven at 100° C. for 120 minutes to fully cure the outermost layer, thereby forming 2 transparent cured material layers (total layer thickness: 6.2 μm). Various physical properties of this sample were measured and evaluated.

On the other hand, another sample of a resin plate having a fully cured transparent cured material layer of coating solution (A-5) formed was evaluated with regard to an abrasion resistance. The abrasion resistance after 100 rotations was 2.6%.

Example 30

A coating solution having the same composition as coating solution (A-2) was prepared in the same manner as in the preparation of coating solution (A-2), except that 1 g of 2-[2-hydroxy-5-(acryloyloxyethyl)phenyl]benzotriazol was used in place of 1 g of 2-(3,5-di-t-pentyl-2-hydroxyphenyl) benzotriazol. Hereinafter, this coating solution was referred to as "coating solution (A-6)".

Coating solution (A-6) was coated on a resin plate by a bar-coater (wet thickness: 16 μm) and dried, and was irradiated with ultraviolet light of 150 mJ/cm² to form a partially cured material layer having a layer thickness of 5 μm. Coating solution (B-1) was coated on the partially cured material layer (wet thickness: 6 μm) and dried, and was irradiated with ultraviolet light of 3000 mJ/cm². Finally, this sample was maintained in a hot air-circulating oven at 100° C. for 120 minutes, and various physical properties of this sample were measured and evaluated.

On the other hand, another sample of a resin plate having a fully cured transparent cured material layer of coating solution (A-6) formed was evaluated with regard to an abrasion resistance. The abrasion resistance after 100 rotations was 0.8%.

Example 31

A coating solution having the same composition as coating solution (A-6) was prepared in the same manner as in Example 30, except that mercaptosilane-modified colloidal silica dispersion used in Example 30 was replaced by the same amount of acrylsilane-modified colloidal silica dispersion prepared in Example 2, and a sample was prepared by using this coating solution under the same conditions as in Example 30, and various physical properties of this sample were measured and evaluated.

On the other hand, another sample of a resin plate having a fully cured transparent cured material layer formed with the above coating solution was evaluated with regard to an abrasion resistance. The abrasion resistance after 100 rotations was 1.0%.

Example 32

A coating solution having the same composition as coating solution (A-6) was prepared in the same manner as in Example 30, except that mercaptosilane-modified colloidal silica dispersion used in Example 30 was replaced by the same amount of aminosilane-modified colloidal silica dispersion prepared in Example 3, and a sample was prepared by using this coating solution under the same conditions as in Example 30. Various physical properties of this sample were measured and evaluated.

On the other hand, another sample of a resin plate having a fully cured transparent cured material layer formed with the above coating solution was evaluated with regard to an abrasion resistance. The abrasion resistance after 100 rotations was 1.2%.

Example 33

A coating solution having the same composition as coating solution (A-6) was prepared in the same manner as in Example 30, except that mercaptosilane-modified colloidal silica dispersion used in Example 30 was replaced by the same amount of epoxysilane-modified colloidal silica dispersion prepared in Example 4, and a sample was prepared by using this coating solution under the same conditions as in Example 30. Various physical properties of this sample were measured and evaluated.

On the other hand, another sample of a resin plate having a fully cured transparent cured material layer formed with the above coating solution was evaluated with regard to an abrasion resistance. The abrasion resistance after 100 rotations was 1.1%.

Example 34

A sample was prepared in the same manner as in Example 30, except that the production process was modified in the following manner.

Coating solution (A-6) was coated on a resin plate (wet thickness: 16 μm) and dried, which was irradiated with ultraviolet light of 150 mJ/cm² to form a partially cured material layer having a layer thickness of 5 μm. Coating solution (B-1) was further coated on the partially cured material layer (wet thickness: 6 μm) and dried, which was then irradiated with ultraviolet light of 3000 mJ/cm². Thereafter, this sample was maintained in a hot air-circulating oven at 170° C. for 5 minutes, and immediately after taking out, the sample was bending-processed by pressing to a mold having a curvature of 64 mmR so as to make the cured material layer coating side convex, and was then aged for one day at room temperature to obtain a bending-processed sample. A sample thus obtained had a satisfactory outer appearance, and there were observed no defects such as cracks or wrinkles on the outermost layer.

TABLE 2

|  | Initial haze value (%) | Abrasion resistance | | Adhesive-ness | (UV ray absorbing performance) UV ray transmittance (%) |
| --- | --- | --- | --- | --- | --- |
|  |  | 500 times | 1000 times |  |  |
| Example 27 | 0.5 | 2.0 | 3.0 | 100/100 | 2.5 |
| Example 28 | 0.5 | 0.9 | 1.6 | 100/100 | 0.1 |
| Example 29 | 0.5 | 0.7 | 1.2 | 100/100 | 2.1 |
| Example 30 | 0.4 | 1.2 | 2.2 | 100/100 | 0.1 |
| Example 31 | 0.4 | 1.4 | 2.3 | 100/100 | 0.1 |
| Example 32 | 0.4 | 1.0 | 1.8 | 100/100 | 0.1 |
| Example 33 | 0.4 | 1.0 | 1.8 | 100/100 | 0.1 |

Example 35

A coating solution having the same composition as coating solution (A-1) was prepared in the same manner as in the preparation of coating solution (A-1), except that 1 g of 2-[4-(2-hydroxy-3-dodecyloxypropyloxy)-2-hydroxyphenyl]-4,6-bis(2,4-dimethylphenyl)-1,3,5-triazine was used in place of 1 g of 2-(3,5-di-t-pentyl-2-hydroxyphenyl)benzotriazol. Hereinafter, this coating solution is referred to as "coating solution (A-7)".

Coating solution (A-7) was coated on a resin plate by a bar-coater (wet thickness: 30 μm) and dried, and was irradiated with ultraviolet light of 150 mJ/cm² to form a partially cured material layer having a layer thickness of 7 μm. Coating solution (B-1) was further coated on the partially cured material layer (wet thickness: 6 μm) and dried, and was irradiated with ultraviolet light of 3000 mJ/cm² and was maintained in air atmosphere having a relative humidity of 50% for 24 hours to form a transparent cured material layer having a total layer thickness of 8.2 μm.

This sample had an initial haze value of 0.5%, an abrasion resistance of 1.8% after 500 rotations and 3.0% after 1000 rotations, and an adhesiveness of 100/100, and a weather resistance of this sample was not changed.

On the other hand, another sample of a resin plate having a fully cured transparent cured material layer formed with coating solution (A-6) was evaluated with regard to an abrasion resistance, and the abrasion resistance after 100 rotations was 2.5%.

Example 36

0.60 g of 2-methyl-1-{4-(methylthio)phenyl}-2-morpholinopropane-1-one was added to 100 g of a xylene solution of perhydropolysilazane containing no catalyst used in Example 9 (solid content: 20 wt %, number average molecular weight of perhydropolysilazane: 700, tradename "V110" manufactured by Tonen K.K.), and the mixture was stirred at room temperature for 60 minutes in nitrogen atmosphere to prepare a coating solution (hereinafter referred to as "coating solution (B-2)").

Coating solution (B-2) was used in place of coating solution (B-1) in Example 6, and was coated on the surface of a cured material layer (layer thickness: 7 μm) of coating solution (A-1) (wet thickness: 3 μm) and dried, and was irradiated with ultraviolet light of 3000 mJ/cm² to form a transparent cured material layer having a total layer thickness of 7.6 μm.

This sample had an initial haze value of 0.5%, an abrasion resistance of 1.7% after 500 rotations and 2.9% after 1000 rotations, and an adhesiveness of 100/100, and a weather resistance of this sample was not changed.

Example 37

An inner layer and an outer layer were formed on a resin plate in the same manner as in Example 11, except that coating solution (B-2) was used in place of coating solution (B-1) used in Example 11. This sample had an initial haze value of 0.5%, an abrasion resistance of 0.7% after 500 rotations and 1.5% after 1000 rotations, and an adhesiveness of 100/100, and a weather resistance of this sample was not changed.

Example 38

A coating solution (hereinafter referred to as "coating solution (B-3)") was prepared by adding 0.60 g of 2-methyl-1-{4-(methylthio)phenyl}-2-morpholinopropane-1-one to 100 g of a xylene solution of polysilazane having a part of hydrogen on silicon atoms substituted with a methyl group (solid content: 20 wt %, number average molecular weight of polysilazane: 1000, tradename "NL710" manufactured by Tonen K.K.) and stirring the mixture at room temperature for 60 minutes in nitrogen atmosphere.

In the same manner as in Example 7, coating solution (A-1) was coated on a resin plate and dried, and was irradiated with 150 mJ/cm² to form a partially cured material layer having a layer thickness of 7 μm. Thereafter, coating solution (B-3) was coated on the partially cured material layer (wet thickness: 6 μm) and dried, and was then irradiated with ultraviolet light of 3000 mJ/cm².

This sample had an initial haze value of 0.4%, an abrasion resistance of 1.7% after 500 rotations and 3.0% after 1000 rotations, and an adhesiveness of 100/100, and a weather resistance of this sample was not changed.

Example 39

A sample was prepared in the same manner as in Example 6, except that coating solution (B-1) was replaced by a coating solution (hereinafter referred to as "coating solution (B-4)") of a xylene solution of polysilazane having a part of hydrogen on silicon atoms substituted with a (perfluoroalkyl) alkyl group (solid content: 20 wt %, tradename "FPSZ" manufactured by Tonen K.K.).

Thus, coating solution (A-1) was coated on a resin plate and was fully irradiated with ultraviolet light to form a cured material layer having a layer thickness of 5 μm. Thereafter, coating solution (B-4) was coated on the cured material layer (wet thickness: 6 μm) and dried, and was maintained in a hot air-circulating oven at 110° C. for 120 minutes to fully cure, thereby forming two cured material layers having a total layer thickness of 6.2 μm on the resin plate.

This sample had an initial haze value of 0.5%, an abrasion resistance of 2.0% after 500 rotations and 3.0% after 1000 rotations, and an adhesiveness of 100/100, and a contact angle of the outermost layer surface was 102°. The contact angle is a contact angle to water of the surface.

Example 40

A sample was prepared in the same manner as in Example 11, except that coating solution (B-4) was used in place of coating solution (B-1).

Thus, coating solution (B-4) was coated on a partially cured material layer having a layer thickness of 5 μm formed with coating solution (A-2) (wet thickness: 6 μm) and dried, and was irradiated with ultraviolet light of 3000 mJ/cm², and was then maintained in a hot air-circulating oven at 110° C. for 120 minutes to fully cure.

This sample had an initial haze value of 0.5%, an abrasion resistance of 1.0% after 500 rotations and 1.7% after 1000 rotations, and an adhesiveness of 100/100, and a contact angle of the outermost layer surface was 104°.

Example 41

Coating solution (A-1) was coated on a resin plate (wet thickness: 30 μm) and dried, and was irradiated with ultraviolet light of 150 mJ/cm² to form a partially cured material layer having a layer thickness of 7 μm. Thereafter, a xylene solution of perhydropolysilazane containing zinc oxide (tradename "UL-110" manufactured by Tonen K.K., number average molecular weight of perhydropolysilazane: 700, content of perhydropolysilazane: 10 wt %, average particle size of zinc oxide: 20–30 nm and content of zinc oxide: 10 wt %) (hereinafter referred to as "coating solution (B-5)") was coated on the above partially cured coating material layer (wet thickness: 3 μm), and coating solution (B-1) was further coated thereon (total wet thickness: 6 μm) and dried, which was then irradiated with ultraviolet light of 3000 mJ/cm².

This sample was further maintained in air atmosphere having a relative humidity of 50% for 24 hours to form a transparent cured material layer having a total layer thickness of 8.2 μm.

This sample had an initial haze value of 0.5%, an abrasion resistance of 0.8% after 500 rotations and an adhesiveness of 100/100, and a weather resistance of this sample was not changed, and ultraviolet light absorbing performance of this sample was 0.9%.

Example 42

A coating composition (hereinafter referred to as "coating solution (B-6)") was prepared by adding 2.0 g of 2-{2-hydroxy-5-(2-acryloyloxyethyl)phenyl}benzotriazol to 100 g of a xylene solution of perhydropolysilazane containing no catalyst used in Example 9 (tradename: "V110", hereinafter referred to as "V110"), and stirring the mixture at room temperature for 1 hour in nitrogen atmosphere.

In the same manner as in Example 11, coating solution (A-2) was coated on a resin plate to form a partially cured material layer having a layer thickness of 7 μm. Thereafter coating solution (B-6) was coated thereon (wet thickness: 6 μm) and dried, which was then irradiated with ultraviolet light of 3000 mJ/cm$^2$ and was maintained in air atmosphere having a relative humidity of 50% for 24 hours to form a transparent cured material layer having a total layer thickness of 8.2 μm. Physical properties of the sample thus obtained were measured.

This sample had an initial haze value of 0.5%, an abrasion resistance of 0.9% after 500 rotations and an adhesiveness of 100/100, and a weather resistance of this sample was not changed, and this sample had an ultraviolet light absorbing performance of 1.5%.

Example 43

A coating composition (hereinafter referred to as "coating solution (B-7)") was obtained by adding 20 g of a xylene dispersion of colloidal tin oxide (solid content: 20 wt %, average particle size of colloidal tin oxide: 30 nm, manufactured by Shokubai Kasei K.K.) to 100 g of "V110" and stirring the mixture at room temperature in nitrogen atmosphere for 30 minutes.

In the same manner as in Example 7, coating solution (A-1) was coated on a resin plate to form a partially cured material layer having a layer thickness of 7 μm. Coating solution (B-7) was coated thereon (wet thickness: 6 μm) and dried, and was irradiated with ultraviolet light of 3000 mJ/cm$^2$ and was maintained in air atmosphere having a relative humidity of 50% for 24 hours to form a transparent cured material layer having a total layer thickness of 8.2 μm. Physical properties of the sample thus obtained were measured.

This sample had an initial haze value of 0.6%, an abrasion resistance of 0.7% after 500 rotations and an adhesiveness of 100/100, and a weather resistance of this sample was not changed.

Example 44

A coating composition (hereinafter referred to as "coating solution (B-8)") was obtained by adding 20 g of a xylene dispersion of colloidal silica (solid content: 20 wt %, average particle size of colloidal silica: 15 nm, manufactured by Shokubai Kasei K.K.) to 100 g of "V110", and stirring the mixture at room temperature for 30 minutes in nitrogen atmosphere.

In the same manner as in Example 7, coating solution (A-1) was coated on a resin plate to form a partially cured material layer having a layer thickness of 7 μm. Coating solution (B-8) was coated on the partially cured material layer (wet thickness: 6 μm) and dried, which was then irradiated with ultraviolet light of 3000 mJ/cm$^2$ and was maintained in air atmosphere having a relative humidity of 50% for 24 hours to form a transparent cured material layer having a total layer thickness of 8.2 μm. Physical properties of the sample thus obtained were measured.

This sample had an initial haze value of 0.5%, an abrasion resistance of 0.6% after 500 rotations and an adhesiveness of 100/100, and a weather resistance of this sample was not changed.

Example 45

A coating composition (hereinafter referred to as "coating solution (B-9)") was obtained by adding 4 g of tricyclodecanedimethanol diacrylate to 100 g of "V110" and stirring the mixture at room temperature for 30 minutes in nitrogen atmosphere.

In the same manner as in Example 7, coating solution (A-1) was coated on a resin plate to form a partially cured material layer having a layer thickness of 7 μm. Thereafter, coating solution (B-9) was coated on the partially cured material layer (wet thickness: 6 μm) and dried, which was then irradiated with ultraviolet light of 3000 mJ/cm$^2$ and was maintained in air atmosphere having a relative humidity of 50% for 24 hours to form a transparent cured material layer having a layer thickness of 8.4 μm. Physical properties of the sample thus obtained were measured.

This sample had an initial haze value of 0.6%, an abrasion resistance of 1.7% after 500 rotations and an adhesiveness of 100/100, and a weather resistance of this sample was not changed.

What is claimed is:

1. A transparent coated molded product comprising a transparent synthetic resin substrate and two or more transparent cured material layers provided on at least one part of a surface of the transparent synthetic resin substrate, wherein said at least two or more transparent cured material layers includes an inner layer in contact with an outermost layer, wherein the inner layer is an abrasion resistant layer which is a cured material of an active energy ray-curable coating agent (A) containing a polyfunctional compound (a) having at least 2 active energy ray-curable polymerizable functional groups and the outermost layer is a silica layer which is a cured material of a curable coating agent (B) of polysilazane or a curable coating agent (B) containing polysilazane, wherein, the cured material of the coating agent (A) is a cured material having an abrasion resistance expressed by a haze value of at most 10% after 100 rotations of an abrasion resistance test in accordance with JIS R 3212.

2. The transparent coated molded product according to claim 1, wherein the active energy ray is ultraviolet light.

3. The transparent coated molded product according to claim 1, wherein the polyfunctional compound (a) is a compound having at least 2 (meth)acryloyl groups.

4. The transparent coated molded product according to claim 1, wherein the coating agent (A) further contains a photopolymerization initiator.

5. The transparent coated molded product according to claim 1, wherein the coating agent (A) further contains a colloidal silica having an average particle size of at most 200 nm.

6. The transparent coated molded product according to claim 5, wherein the colloidal silica is a colloidal silica, the surface of which is previously modified with a compound having a hydrolyzable silicon group.

7. The transparent coated molded product according to claim 1, wherein the coating agent (A) further contains an ultraviolet light absorber.

8. The transparent coated molded product according to claim 7, wherein the ultraviolet light absorber is an ultraviolet light absorber having a polymerizable functional group curable by an active energy ray.

9. The transparent coated molded product according to claim 1, wherein the cured material layer of the coating agent (A) has a thickness of from 1 to 50 μm.

10. The transparent coated molded product according to claim 1, wherein the polysilazane is perhydropolysilazane.

11. The transparent coated molded product according to claim 1, wherein the coating agent (B) further contains a photopolymerization initiator.

12. The transparent coated molded product according to claim 1, wherein the coating agent (B) further contains an ultraviolet light absorber.

13. The transparent coated molded product according to claim 1, wherein the cured material layer of the coating agent (B) has a thickness of from 0.05 to 10 μm.

14. The transparent coated molded product according to claim 1, wherein the transparent synthetic resin substrate is a plate-like material of an aromatic polycarbonate type resin.

15. The transparent coated molded product according to claim 1, wherein the transparent coated molded product is a synthetic resin-made window material.

16. A method for preparing a transparent coated molded product comprising a transparent synthetic resin substrate and two or more transparent cured material layers provided on at least one part of a surface of the transparent synthetic resin substrate, wherein said at least two or more transparent cured material layers includes an inner layer in contact with an outermost layer, wherein the inner layer is an abrasion resistant layer which is a cured material of an active energy ray-curable coating agent (A) containing a polyfunctional compound (a) having at least 2 active energy ray-curable polymerizable functional groups and the outermost layer is a silica layer of a cured material of a curable coating agent (B) of polysilazane or a curable coating agent (B) containing polysilazane, the method comprising forming a cured material layer of the coating agent (A), forming an uncured material layer of the coating agent (B) on the surface of the cured material layer of the coating agent (A) and then curing; wherein, the cured material of the coating agent (A) is a cured material having an abrasion resistance expressed by a haze value of at most 10% after 100 rotations of an abrasion resistance test in accordance with JIS R 3212.

17. A method for preparing a transparent coated molded product comprising a transparent synthetic resin substrate and two or more transparent cured material layers provided on at least one part of a surface of the transparent synthetic resin substrate, wherein said at least two or more transparent cured material layers includes an inner layer in contact with an outermost layer, wherein the inner layer is an abrasion resistant layer which is a cured material of an active energy ray-curable coating agent (A) containing a polyfunctional compound (a) having at least 2 active energy ray-curable polymerizable functional groups and the outermost layer is a silica layer of a cured material of a curable coating agent (B) of polysilazane or a curable coating agent (B) containing polysilazane, the method comprising forming an uncured or partially cured material layer of the coating agent (A), forming an uncured material layer of the coating agent (B) on the surface of the uncured or partially cured material layer of the coating agent (A), and curing the uncured or partially cured material of the coating agent (A) and the uncured material of the coating agent (B); wherein, the cured material of the coating agent (A) is a cured material having an abrasion resistance expressed by a haze value of at most 10% after 100 rotations of an abrasion resistance test in accordance with JIS R 3212.

18. A method for preparing a bending-processed transparent coated molded product comprising a transparent synthetic resin substrate and two or more transparent cured material layers provided on at least one part of a surface of the transparent synthetic resin substrate, wherein said at least two or more transparent cured material layers includes an inner layer in contact with an outermost layer, wherein the inner layer is an abrasion resistant layer which is a cured material of an active energy ray-curable coating agent (A) containing a polyfunctional compound (a) having at least 2 active energy ray-curable polymerizable functional groups and the outermost layer is a silica layer of a cured material of a curable coating agent (B) of polysilazane or a curable coating agent (B) containing polysilazane, the method comprising forming a layer of an uncured, partially cured or cured material of the coating agent (A), forming a layer of an uncured or partially cured material of the coating agent (B) on the surface of the layer of the coating agent (A), subjecting the substrate having these layers to bending-processing, and then curing the uncured or partially cured material of the coating agent (B) and the uncured or partially cured material of the coating agent (A); wherein, the cured material of the coating agent (A) is a cured material having an abrasion resistance expressed by a haze value of at most 10% after 100 times rotations of an abrasion resistance test in accordance with JIS R 3212.

19. The method according to claim 18, wherein the bending-processed transparent coated molded product is a window material for a vehicle.

* * * * *